United States Patent
Nakamura et al.

(10) Patent No.: US 7,612,818 B2
(45) Date of Patent: Nov. 3, 2009

(54) INPUT SENSOR CONTAINING DISPLAY DEVICE AND METHOD FOR DRIVING THE SAME

(75) Inventors: Takashi Nakamura, Saitama (JP);
Masahiro Yoshida, Fukaya (JP);
Hirotaka Hayashi, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 774 days.

(21) Appl. No.: 11/080,577

(22) Filed: Mar. 16, 2005

(65) Prior Publication Data

US 2005/0212916 A1    Sep. 29, 2005

(30) Foreign Application Priority Data

Mar. 29, 2004   (JP) ............................. 2004-096829
May 14, 2004    (JP) ............................. 2004-144950
May 14, 2004    (JP) ............................. 2004-144951

(51) Int. Cl.
*H04N 3/14* (2006.01)
*H04N 5/335* (2006.01)
*H01L 31/00* (2006.01)
*G09G 3/36* (2006.01)

(52) U.S. Cl. ..................... 348/308; 257/59; 345/104; 345/207

(58) Field of Classification Search ................. 345/104, 345/207; 257/59; 348/294, 333.01, 301, 348/308; 250/208.1

See application file for complete search history.

(56) References Cited

U.S. PATENT DOCUMENTS 5,446,564 A * 8/1995 Mawatari et al. ............ 345/104
5,585,817 A * 12/1996 Itoh et al. .................... 345/104
5,812,109 A * 9/1998 Kaifu et al. .................. 345/104
6,236,063 B1 5/2001 Yamazaki et al.
6,424,326 B2 * 7/2002 Yamazaki et al. ............. 345/76
6,609,188 B1 * 8/2003 Dunton ........................ 348/721
7,423,622 B2 * 9/2008 Motai .......................... 345/98
2001/0055008 A1 * 12/2001 Young et al. ................. 345/204
2004/0008172 A1 * 1/2004 Nakamura et al. ............. 345/89
2004/0043676 A1 * 3/2004 Tada et al. .................... 439/894
2005/0045881 A1 * 3/2005 Nakamura et al. ............. 257/59
2006/0131504 A1 * 6/2006 Kerr et al. ..................... 345/82

FOREIGN PATENT DOCUMENTS

| | | |
|---|---|---|
| JP | 5-252445 | 9/1993 |
| JP | 11-317910 | 11/1999 |
| JP | 2001-292276 | 10/2001 |
| JP | 2001-306240 | 11/2001 |
| JP | 2001-339640 | 12/2001 |
| WO | 2004/001712 | 12/2003 |

* cited by examiner

*Primary Examiner*—Jason Whipkey
(74) *Attorney, Agent, or Firm*—Oblon, Spivak, McClelland, Maier & Neustadt, L.L.P.

(57) ABSTRACT

An input sensor containing a display device including a group of pixel circuits arranged in a matrix, a group of optical sensor circuits arranged in a matrix, a display driving circuit which provides a display signal to the display element group and which provides a driving signal to the display element group, a read circuit which identifies an optical sensor to read a sense signal from this optical sensor, and a read signal processing section which processes the sense signal output by the read circuit in accordance with a command. The read signal processing section has an interface section which transfers, when the command requesting execution of an application is set to the interface section, the command to a command register.

10 Claims, 22 Drawing Sheets

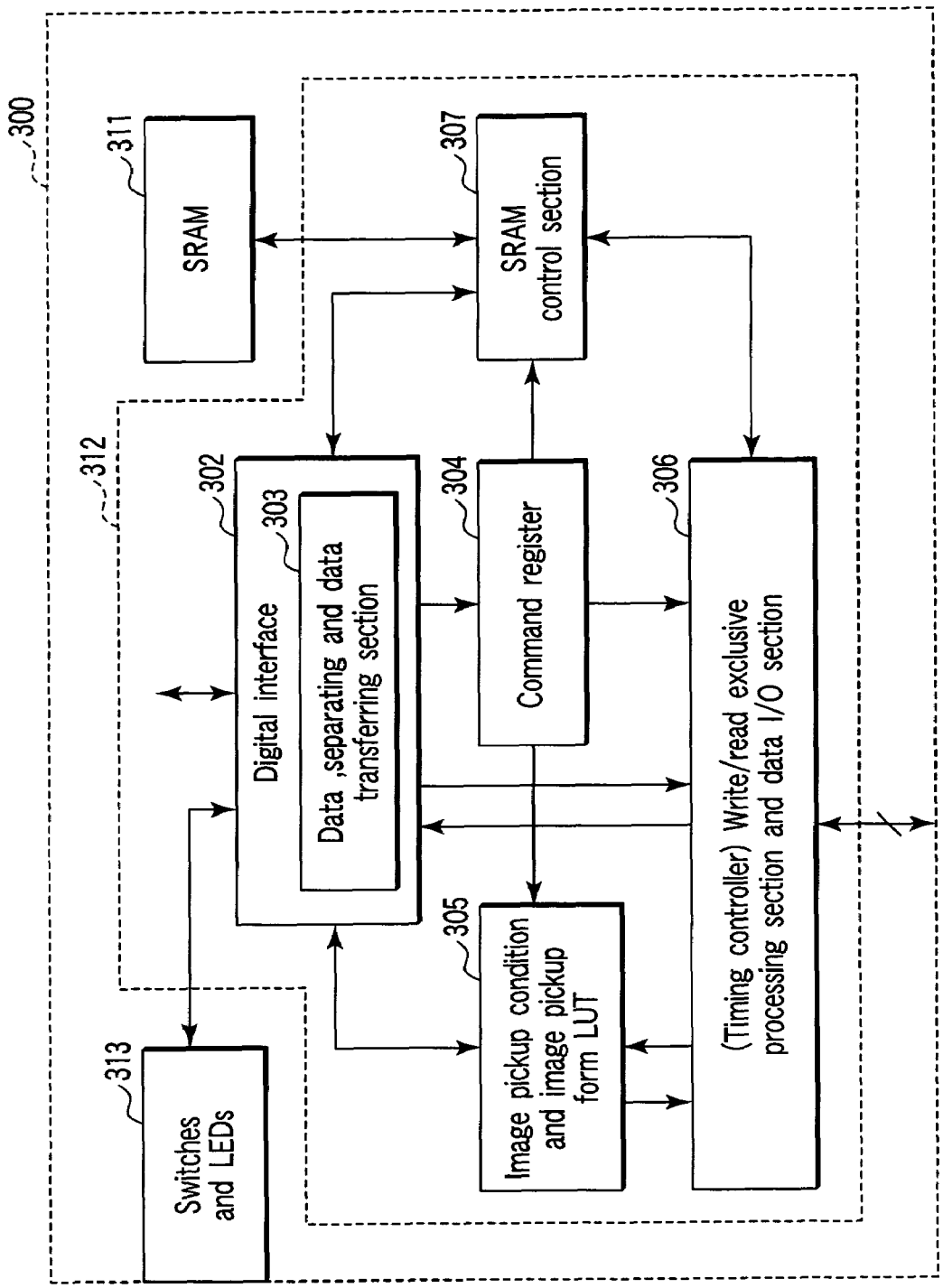
F I G. 2

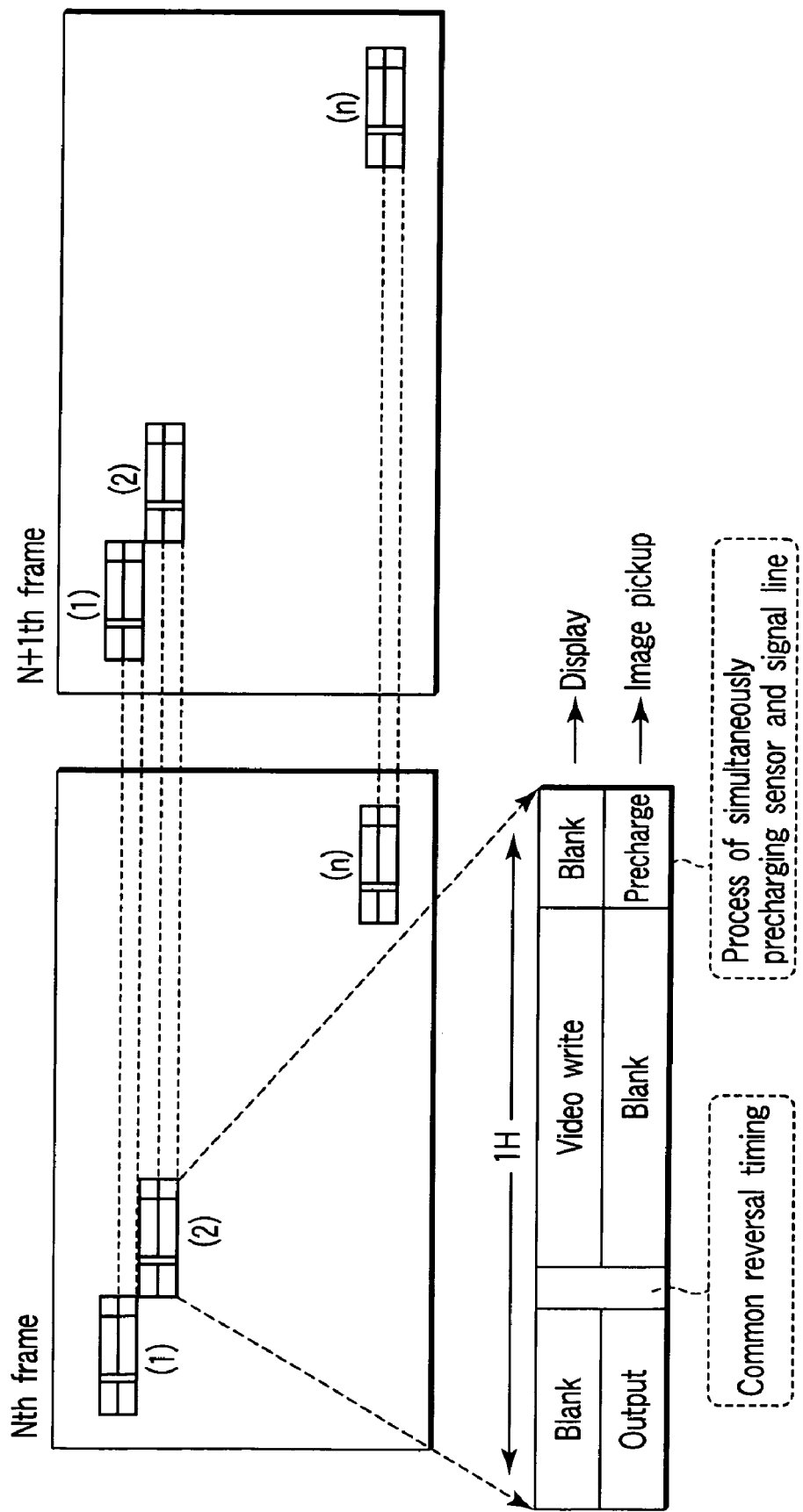
F I G. 5

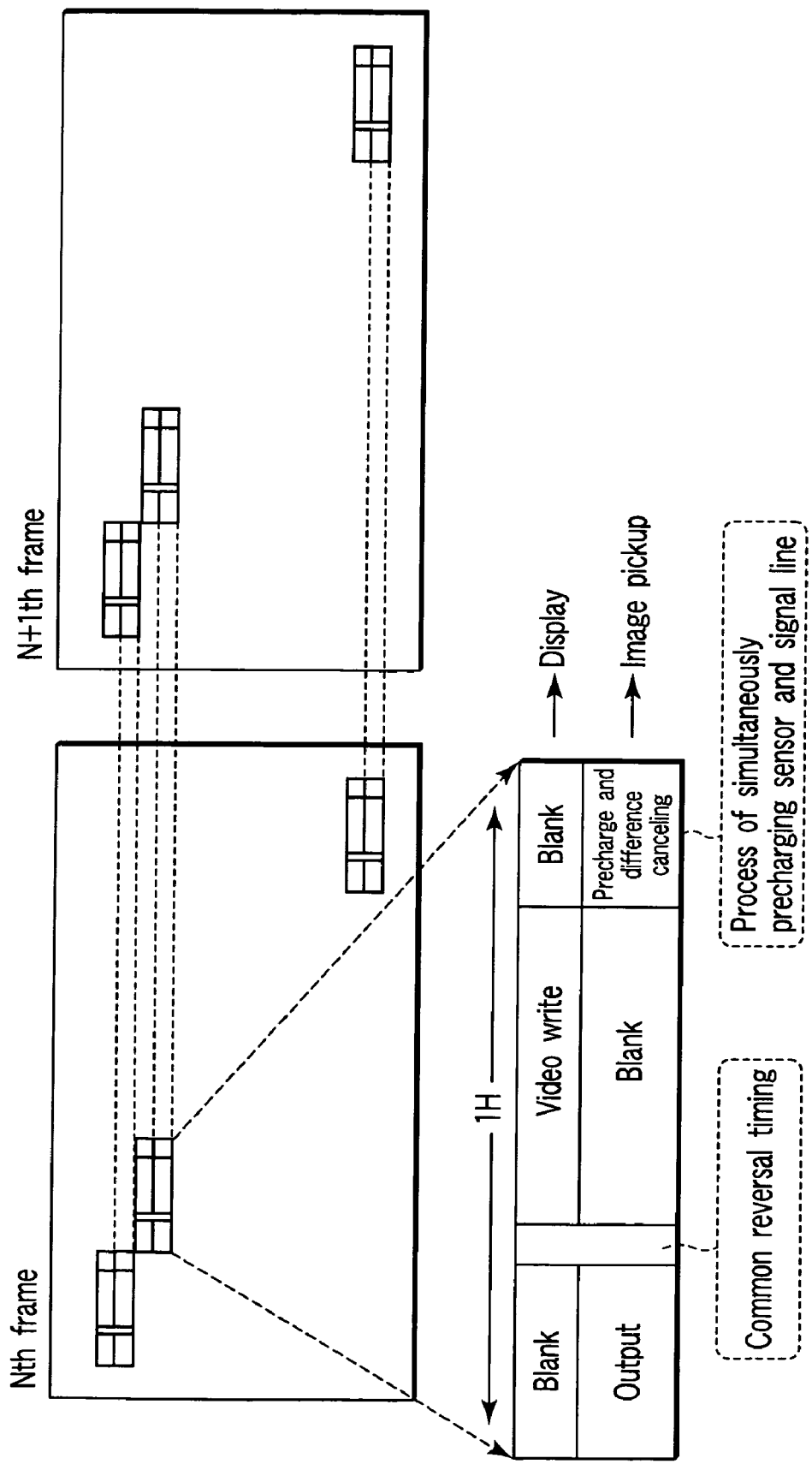
F I G. 24

INPUT SENSOR CONTAINING DISPLAY DEVICE AND METHOD FOR DRIVING THE SAME

CROSS-REFERENCE TO RELATED APPLICATIONS

This application is based upon and claims the benefit of priority from prior Japanese Patent Applications No. 2004-096829, filed Mar. 29, 2004; No. 2004-144950, filed May 14, 2004; and No. 2004-144951, filed May 14, 2004, the entire contents of all of which are incorporated herein by reference.

BACKGROUND OF THE INVENTION

1. Field of the Invention

The present invention relates to a planar display device using liquid crystal or light emitting elements, and in particular, to an input sensor containing display device that contains input sensors.

2. Description of the Related Art

A liquid crystal display device comprises an array substrate on which signal lines, scan lines, and pixel transistors (for example, thin film transistors) are provided in a line and a driving circuit that drives the signal lines and the scan lines. Recent progress and development of integrated circuit technologies have put to practical use a process technology for forming a part of the driving circuit on the array substrate. This has served to reduce the weight, thickness, and size of the whole liquid crystal display device. As a result, the liquid crystal display device is widely utilized in various portable apparatuses such as cellular phones and notebook computers.

A liquid crystal display device has been proposed in which photoelectric conversion elements are arranged on the array substrate to provide an additional image loading function (see, for example, Jpn. Pat. Appln. KOKAI Publication Nos. 2001-292276 and 2001-339640).

In a liquid crystal display device of this kind, the amount of charge in a capacitor connected to the photoelectric conversion element varies with the quantity of light received by the photoelectric conversion element. Image loading is carried out by detecting the voltage across the capacitor.

Recently, technologies have been developed which form pixel transistors and a driving circuit on a glass substrate using a polysilicon process. The polysilicon process can also be used to easily form the photoelectric conversion element adjacent to each pixel transistor.

If display elements and photoelectric conversion elements (photosensors) are built into the liquid crystal display device, it is necessary to have a display data processing device for driving the display elements and a data processing device for processing data read from the photoelectric conversion elements. Moreover, if contents shown by an image displayed by the display elements are associated with the contents (timings, coordinate positions, and the like) of the read data (pickup image data), an associated data processing device that processes the associations is required. Further, since the contents of the read data vary depending on a user's operation, it is important that the associated data processing device have various applications.

Further, if data is to be read from the photoelectric conversion element, its read speed may create a problem. For example, when the display device is used as an operation panel, touch operations may be frequently performed at high speed. To sense such high speed touch operations, data reads must also be carried at high speed.

Furthermore, the above optical sensor is composed of a low-temperature polysilicon thin film transistor (Poly-Si-TFT). To obtain an output from the optical sensor, amplifiers are normally used because only a small current is available for optical responses. However, in the display device, since TFT amplifiers are constructed on the glass substrate, there are marked differences in characteristics (or detection capability) between amplifiers. With such marked differences in characteristics between the amplifiers, the results of detections are not reliable. This may cause the results of detections to be incorrectly recognized. Therefore, the reliability of the product may be degraded.

BRIEF SUMMARY OF THE INVENTION

Thus, according to an aspect of the present invention, there is provided a display device containing an input sensor (for example, a photoelectric conversion element), which device can flexibly process data and which has various applications, the device being able to efficiently process display data, read data, and data on associations between the display data and image pickup data.

According to another aspect of the present invention, there is provided a display device containing an input sensor (for example, a photoelectric conversion element), which device can improve a data read speed.

According to another aspect of the present invention, it is possible to avoid making the results of detections unstable particularly as a result of differences in characteristics between amplifiers that obtain optical sensor outputs, thus accomplishing stable reads. Further, a method for driving an input device containing display device is provided, which method is implemented by effectively utilizing signal lines inherently used to input display signals and without the need to increase the number of components.

An embodiment of the present invention comprises a group of display elements arranged in a matrix, a group of sensors arranged in a matrix, a display driving circuit which provides a display signal to each column of the display element group and which provides a driving signal to each row of the display element group, a read circuit which specifies a row and column of the optical sensor group to identify an optical sensor to read a sense signal from this optical sensor, read signal processing means for processing the sense signal output by the read circuit in accordance with a command requesting execution of an application, and an interface section which transfers a command requesting execution of the application to the read signal processing means.

As described above, the display device has the read signal processing means for processing the sense signal output by the read circuit in accordance with a command requesting execution of an application and the interface section which transfers a command requesting execution of the application to the read signal processing means. Consequently, various processes can be executed to improve flexibility.

Another embodiment of the present invention comprises a display element circuit group including a plurality of display elements arranged in a matrix, a sensor circuit group including optical sensors arranged in a matrix, a display driving circuit which provides display signals to column lines of the display element circuit group and which provides driving signals to row lines of the display element circuit group, a read circuit which specifies one column line and a plurality of row lines of the optical sensor circuit group for a part of one particular horizontal period within one frame to identify a group of a plurality of optical sensor circuits to read sense signals from the plurality of optical sensors as arithmetic outputs, and read signal processing means for processing the sense signals output by the read circuit.

The sense signals output by the read circuit are arithmetic outputs of sense signals from the plurality of optical sensors. This sharply increases the read speed compared to that in which a sense signal is read from each optical sensor.

According to another aspect of the present invention, the invention basically comprises an amplifier (or amplifying element) which amplifies a signal from a sensor in a pixel, the sensor being connected to an input of the amplifier, means for setting an input voltage of each amplifier to an operating threshold of the amplifier, and means for shifting the input voltage of the amplifier by a predetermined value before the amplifier outputs a signal.

Another aspect of the present invention comprises a sensor section in which a capacitor and a photodiode form a parallel circuit, an amplifying transistor having a gate to which one electrode of the sensor section is connected, a difference canceling transistor connected in series between one electrode of the amplifying transistor and the one electrode of the sensor section, an I/O transistor having one electrode connected to the one electrode of the amplifying transistor, a first signal line connected to the other electrode of the I/O transistor, a second signal line connected to the other electrode of the amplifying transistor, a third signal line connected to the other electrode of the sensor section, a first gate line connected to a control gate of the difference canceling transistor, a second gate line connected to a control gate of the I/O transistor, means for, during a precharge period of the capacitor, providing a first predetermined potential to the first signal line while providing a zero voltage to the second and third signal lines, to turn on the difference canceling transistor via the second gate line while turning on the I/O transistor via the second gate line, means for, during a difference canceling period following the precharge period, turning on the difference canceling transistor via the first gate line while turning off the I/O transistor via the second gate line, means for, during an image pickup period, turning off the difference canceling transistor via the first gate line while turning off the I/O transistor via the second gate line, and means for, during a read period, providing the first signal line with the first predetermined potential while providing the second signal line with a zero voltage and the third signal line with a potential which is almost half a preset maximum variation range of the sensor section, to turn off the difference canceling transistor via the first gate line while turning on the I/O transistor via the second gate line.

The above means sets the initial potential of the capacitor equal to the threshold Vth of the amplifying transistor during a difference canceling period. Therefore, in connection with optical detections, whether or not the voltage across the capacitor has varied can be determined depending on whether the potential of the capacitor substantially remains at the threshold Vth or decreases. A detection based on this determination is carried out during the read period. In this case, the device determines whether or not the predetermined potential of the signal line varies, that is, whether the amplifying transistor remains off or is turned on.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing the configuration of a display and image pickup data processing section in FIG. 1;

FIG. 5 is a diagram illustrating display and image pickup timings for each frame in a device according to the present invention;

FIG. 24 is a diagram illustrating display and image pickup timings for each frame in the device according to the present invention.

DETAILED DESCRIPTION OF THE INVENTION

Figure 1:
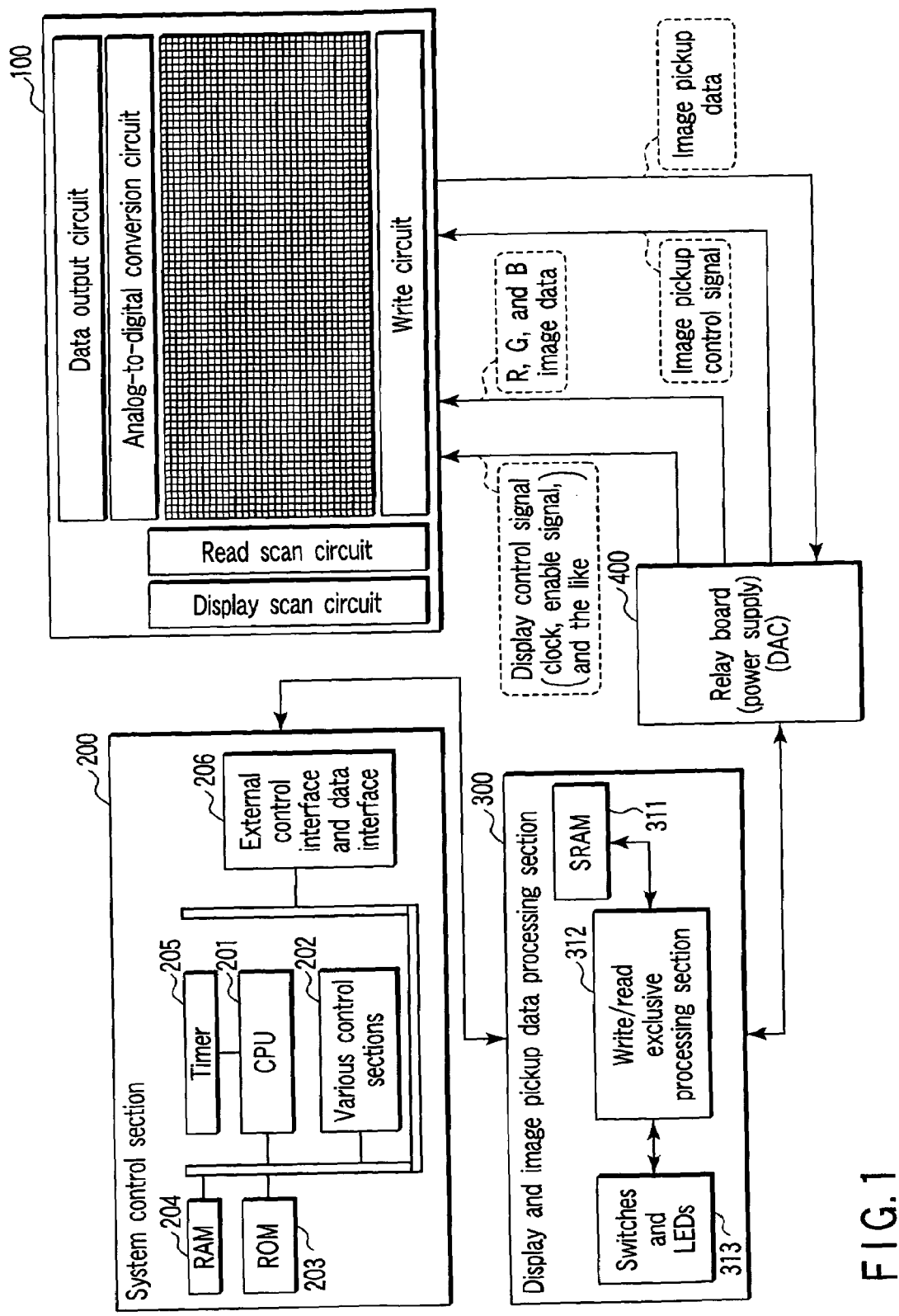
FIG. 1 is a block diagram showing an embodiment of the present invention.

Embodiments of the present invention will be described below with reference to the drawings. FIG. 1 shows the general configuration of an input sensor containing display device according to an embodiment of the present invention. Reference numeral 100 denotes a display and sensor section using, for example, liquid crystals. The display and sensor section 100 contains display elements two-dimensionally arranged in a matrix and sensing elements two-dimensionally arranged in a matrix. This structure will be described in detail later.

Reference numeral 200 denotes a system control section that controls each section of the input sensor containing display device or an externally independently provided system control section (computer apparatus). The system control section relates to the present invention. The system control section 200 is constructed on a main board. The system control section has a microcomputer 201 and various control sections 202 that perform various control operations on the basis of the microcomputer 201 and application programs. Basic programs are stored in a ROM 203. Various application programs are stored in a RAM 204. A timer 205 generates reference time information for the device. Reference numeral 206 denotes an external control interface and data interface that inputs and outputs control data (input and output of commands) and image data. The external control interface and data interface enables connections to an external apparatus, a set-top box, a tuner, a modem, a personal computer, or the like.

Reference numeral 300 denotes a display and image pickup data processing section which realizes a display state and an image pickup state of the display and sensor section 100 and which provides display and pickup timings and area settings, in response to instructions from the system control section 200. The display and image pickup data processing section 300 has a write/read exclusive processing section 301. The display and image pickup data processing section 300 can temporarily save picked-up image data and image data to be displayed, to a memory (SRAM) 311. Moreover, the display and image pickup data processing section 300 has a switch and LED processing section 313. The switch and LED processing section 313 can process external switch inputs (for example, operation signals for sensitivity and luminance adjustments) and drive light emitting elements (LEDs) so as to inform a user of the status of the system.

The read/write exclusive processing section 312 includes a read signal processing section and a write signal processing section. The read signal processing section can convert a sense signal from the display and sensor section 100 into various statuses on the basis of an application. The write signal processing section executes a process of transmitting a signal to be displayed, to the display and sensor section 100.

The write/read exclusive processing section 312 is connected to the display and sensor section 100 via a relay board 400. A power supply circuit, a digital-to-analog converter that converts image data for display, and the like are mounted on the relay board 400.

Signals provided to the display and sensor section 100 are roughly classified into a display control signal, display RGB image data, and image pickup control data. A signal read from the display and sensor section 100 is image pickup data.

FIG. 2 shows basic function blocks of the display and image pickup data processing section 300, notably the write/read exclusive processing section 301. Reference numeral 302 denotes a digital interface connected to an interface 206 of the system control section 200 and a switch and LED processing section 313. Data loaded into the interface 302 has its type recognized by a data separating and data transferring section 303. An externally transmitted signal is stored in a command register 304.

An image pickup condition and image pickup form lookup table 305 stores information on a plurality of image pickup conditions (precharge voltage, image pickup time, and the like). The information can be written by the system control section 200 via the interface and can be read by the system control section 200. Further, it is possible to monitor a timing signal generated by a write/read timing control section and data I/O section 306 to control, for example, the phase of the timing signal output by the write/read timing control section and data I/O section 306.

The write/read timing control section and data I/O section 306 outputs an image pickup control signal and a display control signal on the basis of control data from the image pickup condition and image pickup form lookup table 305. Moreover, in response to a command from the command register 304, the write/read timing control section and data I/O section 306 can output image pickup data to an external apparatus via the data separating and data transferring section 303. Further, to store image pickup data in the SRAM 311, the write/read timing control section and data I/O section 306 can transfer the data to a SRAM control section 307. Furthermore, the write/read timing control section and data I/O section 306 can receive display image data and send it to the display and sensor section 100. When data stored in the SRAM 311 is used as display image data, the image data is sent to the write/read timing control section and data I/O section 306 via the DRAM control section 307. When external data is used as display image data, the image data is sent to the write/read timing control section and data I/O section 306 via the data separating and data transferring section 303.

The SRAM control section 307 performs control such that image pickup data loaded via the write/read timing control section and data I/O section 306 is stored in the SRAM 311. The SRAM control section 307 also performs control such that image data stored in the SRAM 311 is sent out to the display and sensor section via the write/read timing control section and data I/O section 306. Moreover, the SRAM control section 307 can perform, for example, a process of editing image data stored in the SRAM 311 and a process of switching an image, in accordance with a command. Further, the SRAM control section 307 can send out image data from the SRAM 311 to an external apparatus via the data separating and data transferring section 303 and the interface 302.

Furthermore, the SRAM control section 307 can store image and control data externally sent via the interface 302 and data separating and data transferring section 303. The SRAM control section 307 can also use image pickup data to determine whether or not a user has calculated specified coordinates and tapped a display surface.

Therefore, a microprocessor is built into each of the SRAM control section 307, the write/read timing control section 306, and image pickup condition and image pickup form lookup table 305. Data processing operations in these microprocessors are synchronized.

The command register 304 stores commands. Processes such as the ones described below are executed in accordance with the commands. A reset process can be executed. In a mode specification 1, a normal display mode can be switched to an input enabled mode or vice versa. In the input enabled mode, a state is set in which image pickup data is read from the display and sensor section 100 and processed. In the case of only the normal display, the display and sensor section 100 does not output any image data, thus saving power consumption.

In a mode specification 2, a production image pickup state can be switched to a calibration image pickup state or vice versa. In the calibration image pickup state, the display and sensor section 100 can close (turns off) a display element section to devote the device to image pickup. It is thus possible to acquire data required to reduce image pickup nonuniformity.

Turning off the display element section means that the display elements are made inoperative so that for example, light from a backlight is uniformly output all over a display surface. In this state, the photoelectric conversion elements in the sensor circuit receive only light from a front surface. A light blocking film is formed behind the photoelectric conversion elements to block light from the backlight.

Further, processes described below are executed in accordance with the commands.

A phase signal for a video signal with respect to a reference signal is passed to the write/read timing control section and data I/O section 306, or the write/read timing control section and data I/O section 306 is caused to execute signal processing using an optimum timing for the display and sensor section 100. Further, if image data for two screens is saved to the SRAM 111, the displayed screen is instantaneously switched. If the image pickup condition and image pickup form lookup table 305 and the SRAM control section 307, which switch a transfer mode (handshake (HS)/burst), transfer data of a predetermined unit to the data separating and data transferring section 303 and interface 302, a transfer method, a transfer rate, and the like are set. Sampling timings are specified, that is, timings are specified which are used to sample image pickup data output by the display and sensor section 100. A write permission instruction from the system control section 200 is executed, that is, a data write is permitted for the image pickup condition and image pickup form lookup table 305 and SRAM control section 307 via the interface 302.

In response to a command from the system control section 200, the interface 302 executes a write process on the command register 304. Further, the interface 302 receives data required to set image pickup conditions and an image pickup form, from the system control section 200. The interface 302 further sends the data to image pickup form lookup table 305. The interface 302 also receives image data to be written to the SRAM 311, from the system control section 200. The interface 302 further sends the data to the SRAM control section 307. The interface 302 also receives the results of calculations such as coordinates and tap information from the SRAM control section 307. The interface 302 further sends out the results to the system control section 200.

The transfer mode includes handshake (HS) (up to 1.5 Kbps). At this rate, data is written to the command register 304 and the image pickup condition and image pickup form lookup table 305. The transfer mode also includes burst transfer (up to 160 Mbps). In this mode, data is read from the image pickup condition and image pickup form lookup table 305 and data is written to and read from the SRAM 311. These transfer modes are selectively utilized.

The display and image pickup data processing section 300 receives various applications stored in the various control sections 202 of the system control section 200 and instructions from the system control section 200 which are based on the applications.

Therefore, the device according to the present invention can be used in various manners in accordance with the applications. The display and image pickup data processing section 300, the system control section 200, and the display and sensor section 100 may be integrated together. Alternatively, the display and image pickup data processing section 300 and the display and sensor section 100 may be integrated together, while the system control section 200 may be independent of the sections 300 and 100.

Thus, according to the present invention, it is possible to provide various types of display and image pickup data processing sections 300, notably digital interfaces 302. Specifically, a USB or a wireless modem unit may be used for external connections. Moreover, the digital interface 302 can be connected to a data I/O section of a cellular phone. Furthermore, an RGB terminal or a YIQ terminal may be provided for video signals.

Figure 3:
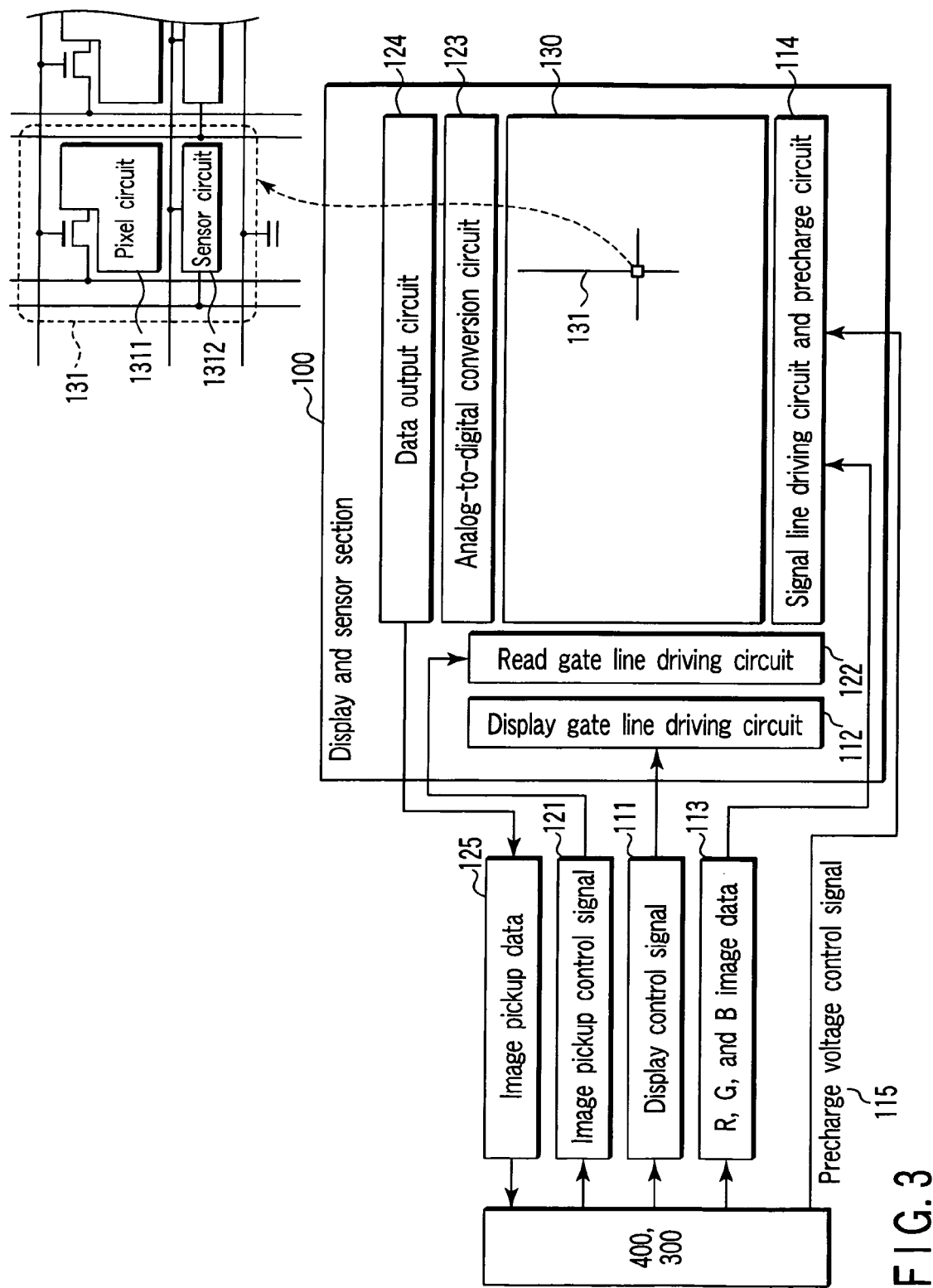
FIG. 3 is a block diagram generally showing a display and sensor section 100 according to the present invention.

FIG. 3 shows function blocks of the display and sensor section 100. Reference numeral 130 denotes a pixel and sensor array section having a group of display elements arranged in a matrix and a group of optical sensors arranged in a matrix. Description will be given later of a pixel and sensor circuits of the pixel and sensor array section 130

A display gate line driving circuit 112 and a read gate line driving circuit 122 are formed on a side (the left of the drawing) of the pixel and sensor array section 130. The display gate line driving circuit 112 drives each row of the group of display elements arranged in a matrix. The read gate line driving circuit 122 drives each row of the group of optical sensors arranged in a matrix.

A signal line driving circuit and a precharge circuit 114 is formed below the pixel and sensor array section 130. The signal line driving circuit and a precharge circuit 114 includes a signal line driving circuit and a precharge circuit.

When pixel data is set in the pixel circuit, the signal line driving circuit supplies pixel data to each column of the group of display elements arranged in a matrix. The precharge circuit precharges a predetermined potential in each capacitor of the group of optical sensors arranged in a matrix. The relationship between the signal line and both a precharge signal and an image pickup signal.

An analog-to-digital conversion circuit 123 and a data I/O circuit 124 are formed above the pixel and sensor array section 130. The analog-to-digital conversion circuit 123 converts an analog signal read from a signal line to the optical sensor group, into a digital signal. The analog-to-digital conversion circuit 123 transfers the digital signal to a data output circuit 124. The data output circuit 124 converts loaded data into serial data and outputs image pickup data 125.

In this case, an image pickup control signal 121 from the display and image pickup data processing section 300 is provided to the read gate line driving circuit 122 via the relay board 400. Further, a display control signal 111 from the display and image pickup data processing section 300 is provided to the display gate line driving circuit 121 via the relay board 400. Moreover, R, G, and B image data from the display and image pickup data processing section 300 is provided to the signal line driving circuit and precharge circuit 114 via the relay board 400. The R, G, and B image data is converted by a digital-to-analog conversion circuit (DAC) on the relay board 400 into an analog voltage suitable for the grayscale display of liquid crystal cells. The analog voltage is then written to a predetermined signal line via the signal line driving circuit and then to pixels in a row specified by the display gate line driving circuit 121. Further, the precharge voltage control signal 115 is provided to the capacitor of a specified sensor circuit. The gray level display of liquid crystal may be based on a frame rate control system.

The pixel and sensor (which may also be referred to as read/write pixel) section 131 is composed of a display pixel circuit (or display element circuit) 1311 and a read sensor circuit 1312.

Figures 4A, 4B:
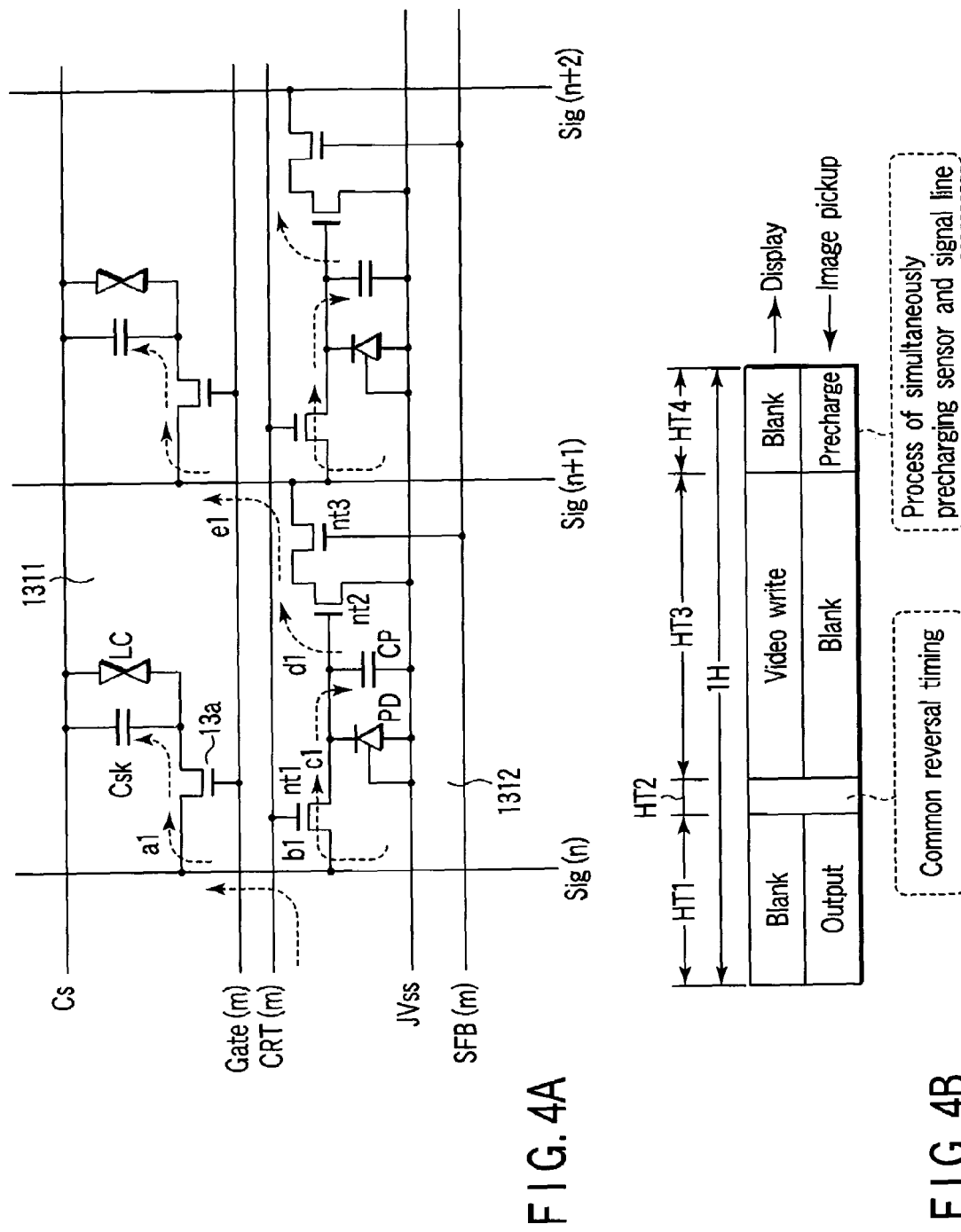
FIGS. 4A and 4B are diagrams illustrating a specific example of a pixel circuit and a sensor circuit and their operations.

FIG. 4A shows an example of the configuration of the read/write pixel circuit. CS denotes a voltage line that provides a predetermined potential to one electrode of each of an auxiliary capacitor Csk and liquid crystal LC at a predetermined cycle. Gate(m) denotes a gate line that controllably turns on and off thin film transistors (TFT; hereinafter referred to as driving transistors) in the pixel circuit 1311. CRT(m) denotes a reset signal line that controllably turns on and off a thin film transistor nt1 constituting the sensor circuit 1312. When the transistor nt1 is turned on, the sensor capacitor CP is precharged. JVss denotes a ground line. SFB(m) denotes a sensor output control line that turns on a thin film transistor nt3 in order to read the potential of the sensor capacitor CP. A thin film transistor nt2 functions as an amplifying element.

PD denotes a photodiode that is sensitive to light and which creates a flow of a current corresponding to the quantity of light. This enables the emission of charges already filled into the sensor capacitor CP. Sig(n) and Sig(n+1) denote signal lines.

If the photodiode PD is irradiated with a large quantity of light, a large quantity of electricity is discharged from the sensor capacitor CP. In contrast, if the photodiode PD is irradiated with a small quantity of light, a small quantity of much electricity is discharged from the sensor capacitor CP. The photodiode PD and the backlight (not shown) are subjected to a light blocking process. Therefore, the photodiode PD is sensitive only to light incident from the front surface and not to direct light from the backlight.

The signal lines Sig(n) and Sig(n+1) are connected to the signal line driving circuit 114 and analog-to-digital conversion circuit 123, shown in FIG. 3. Further, the voltage line Cs and the gate line Gate(m) are connected to the display gate line driving circuit 112. The reset signal line CRT(m), the ground line JVss, and the sensor output control line SFB(m) are connected to the read gate line driving circuit 122.

FIG. 4B is a timing chart illustrating operations of the above circuit. In the present circuit, one particular horizontal period within one vertical period (one frame period) is set as described below. The one particular horizontal period means a period in which a horizontal line on which the pixel circuit 1311 and the sensor circuit 1312 are present is specially accessed. Therefore, when the horizontal line on which the sensor circuit 1312 is present is accessed, one horizontal period is as shown in the timing chart in FIG. 4B. Operations of Pixel Circuit (or Display Element Circuit) and Sensor Circuit The pixel circuit 1311 divides one horizontal period (1H) into a first blank period (HT1), a common reversal timing period (HT2), a write period (HT3), and a second blanking period (HT4). In association with these four periods, the sensor circuit 1312 divides one horizontal period (1H) into an output period (HT1), a common reversal timing period (HT2), a blank period (HT3), and a precharge period (HT4). In the periods other than the particular ones within one vertical frame (one frame period), the pixel circuit 1311 is in a display period, while the sensor circuit 1312 is in an image pickup period. Now, description will be given of operations of the pixel circuit 1311 and sensor circuit 1312.

Write Period

In the pixel circuit 1311, an image signal is written to the auxiliary capacitor Csk via the signal line Sig(n) during the write period (HT3) using such a path as shown by arrow a1. The liquid crystal LC is driven in accordance with the value of the voltage across the capacitor Csk to provide grayscale display.

Write Period to Precharge Period

After the blanking period (for the pixel circuit, the write period), the sensor circuit 1321 turns on the transistor nt1 to precharge the capacitor CP. The signal line Sig(n) is also used in this case (path shown by arrows b1 and c1). That is, the write period (HT3) and the precharge period (HT4) deviate from each other to effectively utilize the signal line Sig(n).

Image Pickup Period to Output Period

In the image pickup period, when a current flows through the photodiode PD, the precharge voltage varies. Then, during the next first frame cycle, the transistor nt3 is turned on in the output period (HT1). Then, the voltage of the sensor capacitor CP is amplified by the transistor nt2 and obtained via the signal line Sig(n+1) (see the path of arrows d1 and e1). In the adjacent pixel and sensor (which may also be referred to as read/write pixel) section, a similar operation is performed during this horizontal period. An output from the adjacent sensor circuit is read via the signal line Sig(n+2). During the next horizontal scan period, a similar process is executed on the next scan line.

After precharge and before a read is started, the voltage obtained from the sensor capacitor CP varies in accordance with the time for which the photodiode has been shielded. If the photodiode PD has not been shielded, the read voltage is sufficiently low. If the photodiode has been shielded for a long time, a high voltage is obtained. This makes it possible to determine whether or not there has been an input.

FIG. 5 is a diagram illustrating the above operations for each frame (Nth and N+1th frames). (1), (2), ... (n) denote the first horizontal scan period, the second horizontal scan period, ..., the nth horizontal scan period.

The configuration of the pixel and sensor section is not limited to the above embodiment.

Figure 6:
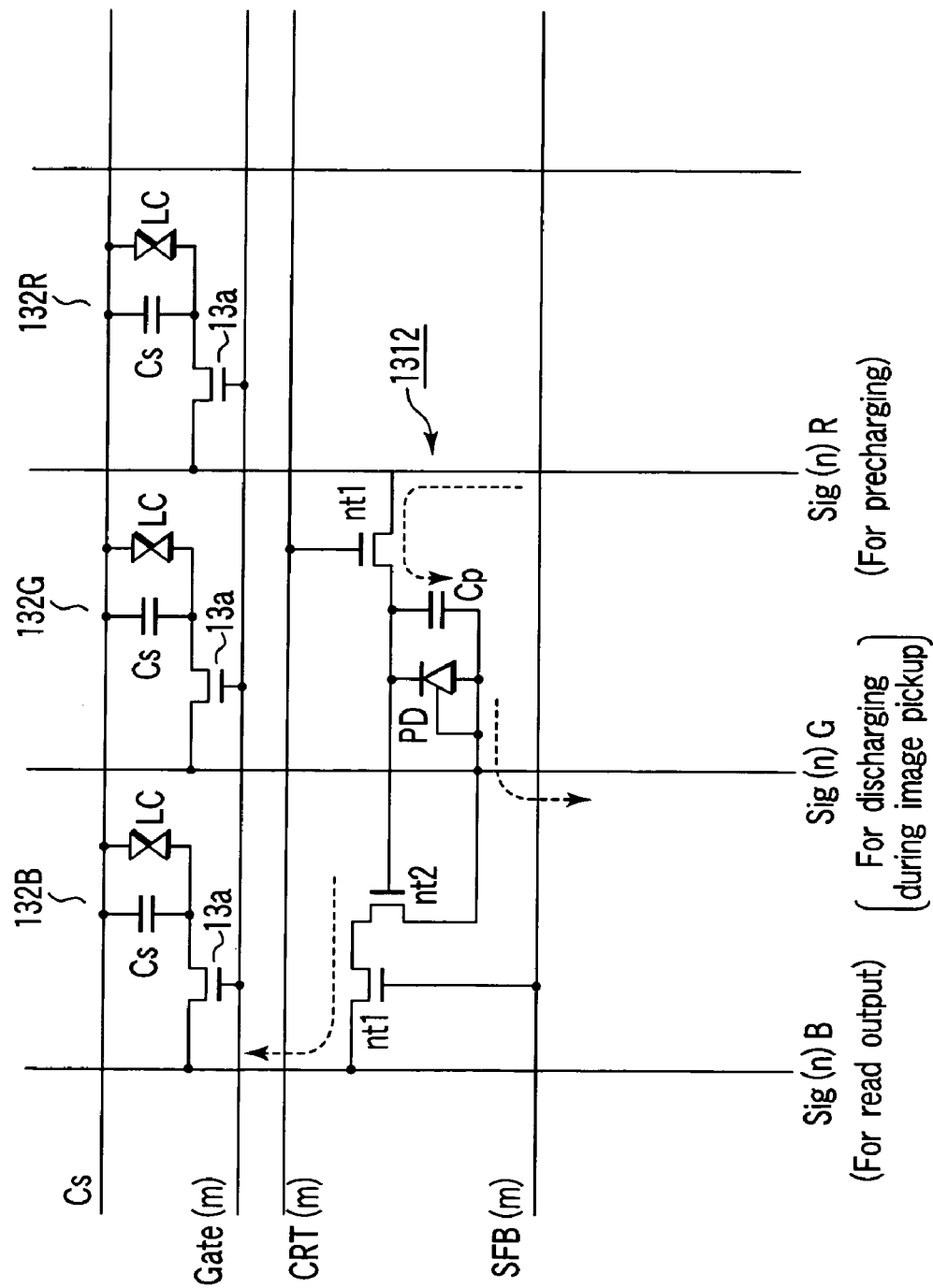
FIG. 6 is a diagram illustrating another specific example of a pixel circuit and a sensor circuit according to the present invention.

FIG. 6 shows another example of the configuration of the pixel and sensor section. This configuration has a blue pixel circuit 132B, a green pixel circuit 132G, and a red pixel circuit 132R as pixel circuits. Accordingly, signal lines Sig(n)B, Sig(n)G, and Sig(n)R are provided in association with the respective circuits 132B, 132G, and 132R. The voltage line Cs, the gate line Gate(m), the reset signal line CRT(m), and the sensor output control line SFB(m) play the same rolls as those in the circuit shown FIG. 4A.

The sensor circuit 1312 is composed of the transistor nt1, the capacitor CP, the photodiode PD, the transistor nt2, which serves as an amplifier, and the transistor nt3, which obtains an output.

In this circuit, the signal lines are also effectively utilized. This will be described below with reference to the timing charts shown in FIGS. 4B and 5. The signal lines Sig(n)B, Sig(n)G, and Sig(n)R are utilized to write video signals to the corresponding capacitors Cs. The signal line Sig(n)R is utilized to precharge the capacitor CP to a predetermined potential during the precharge period. The signal line Sig(n)G is utilized to emit a current flowing through the photodiode PD during the image pickup period. This current emitting operation can be performed by utilizing a part of the period to set the potential of the signal line Sig(n)G for the image pickup period. The signal line Sig(n)B is utilized to amplify and read the voltage of the capacitor CP while image pickup signals are being output.

For the pixel circuits 132B, 132G, and 132R, the transistor 13a is turned off except in a particular horizontal period (write period); these circuits 132B, 132G, and 132R are in the display period.

Figure 7:
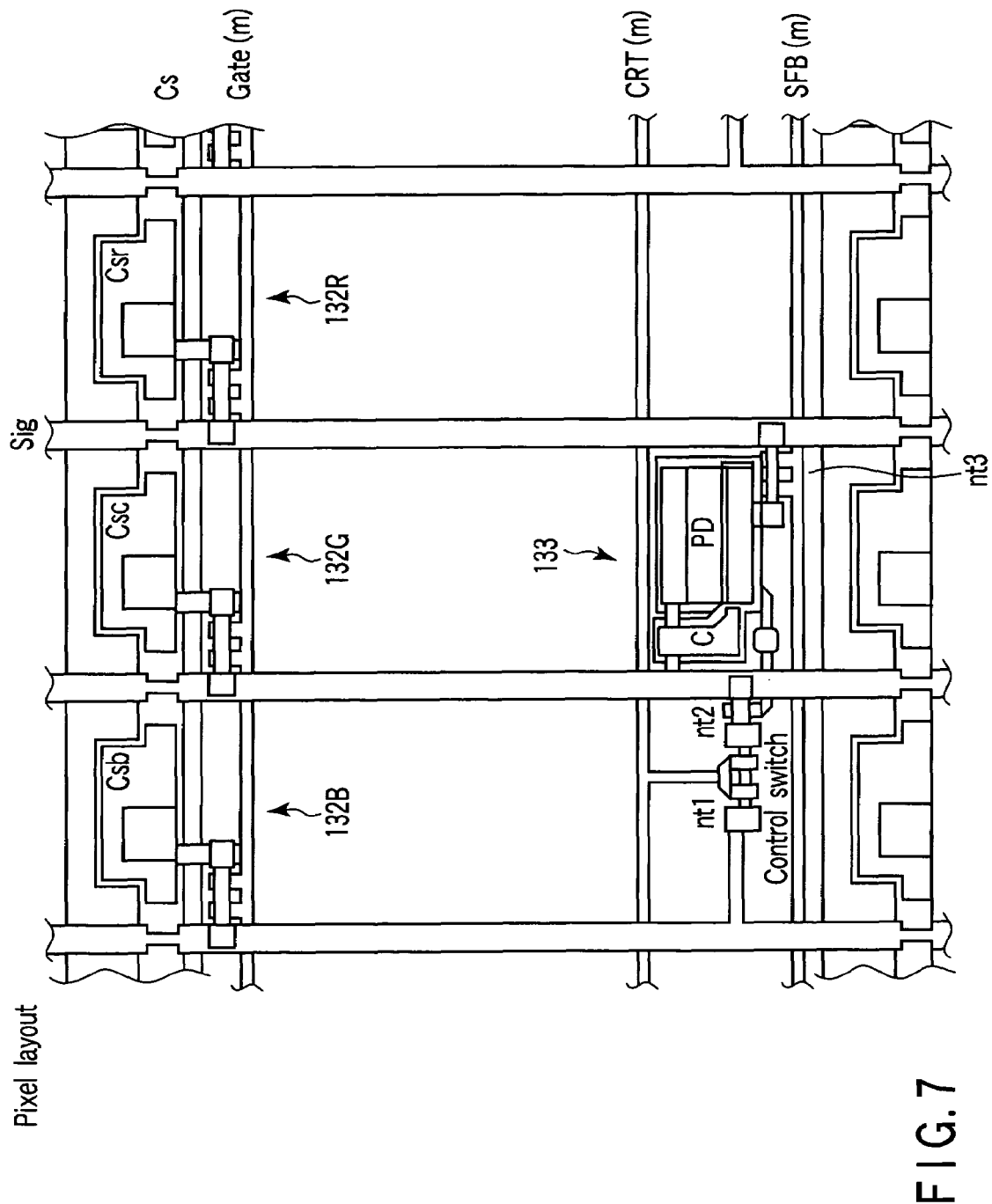
FIG. 7 is a diagram generally illustrating an element pattern of the circuit in FIG. 6.

FIG. 7 shows an example of the layout of elements in which the circuit in FIG. 6 is constructed on a substrate. Corresponding parts are denoted by corresponding reference numerals.

The thus read image pickup data is loaded into the write/read exclusive processing section 312 via the relay board 400, shown in FIG. 1. In this case, the write/read exclusive processing section 312 efficiently loads image pickup data.

Figure 8A:
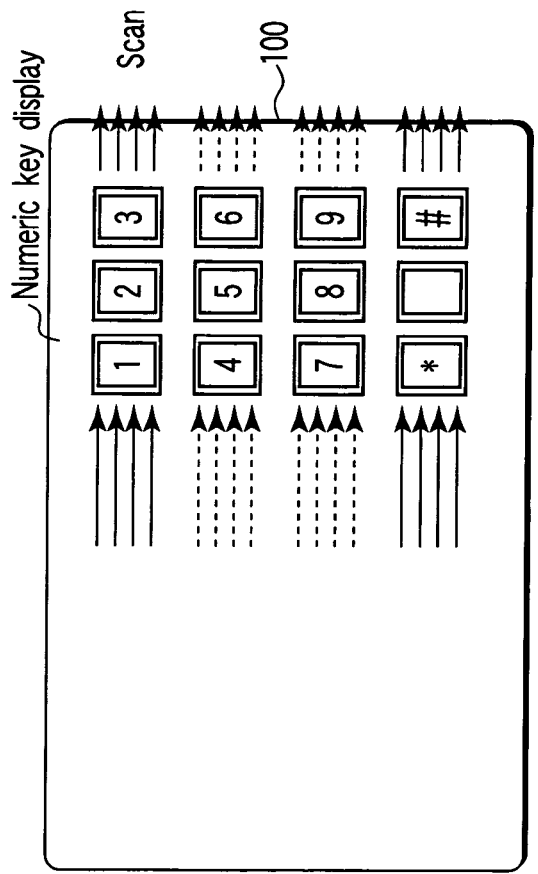
FIGS. 8A and 8B are diagrams illustrating image and sampling timing in order to describe an example of operation of the device according to the present invention.
Figure 8B:
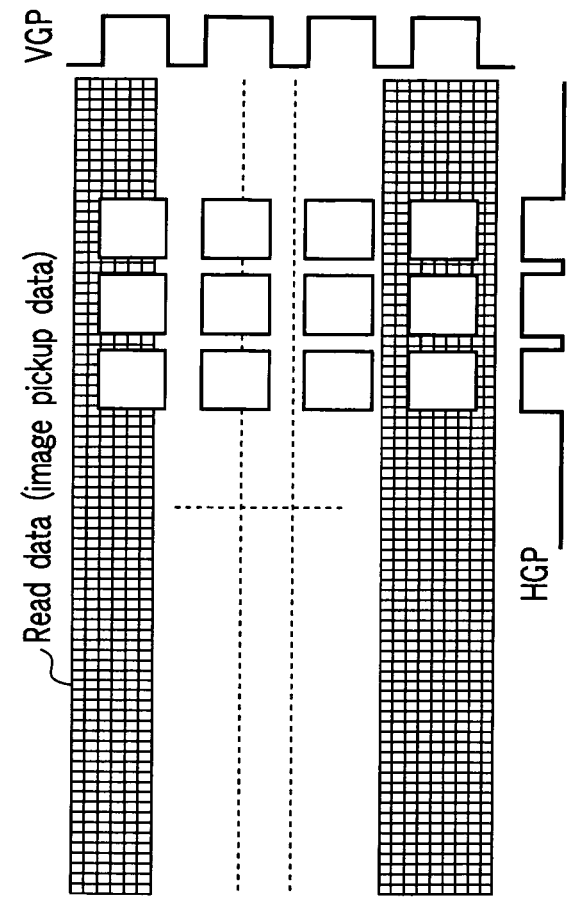

FIGS. 8A and 8B show an example of the case in which the write/read exclusive processing section 312 loads image pickup data. For example, numeric keys may be displayed as shown in FIG. 8A, and the image pickup signal may indicate a state in which any of the keys has been touched. In this case, useful image pickup data is mainly an output from the optical sensor located in the section in which the numeric keys are displayed.

Thus, in the device according to the present invention, the write/read exclusive processing section 312 is set so that only the areas (r1 to r12) are sampled which correspond to the positions at which the ten keys are displayed as shown in FIG. 8B. For sampling timings, on the basis of a table selected from the image pickup condition and image pickup form LUT 305, sampling pulses HGP and VGP such as those shown in FIG. 8B may be generated so that image pickup data can be identified using timings based on these sampling pulses. This makes it possible to efficiently process data on the basis of the minimum required sampling data. According to the present invention, various improvements are made to increase the accuracy with which the image pickup data is identified.

Figure 9:
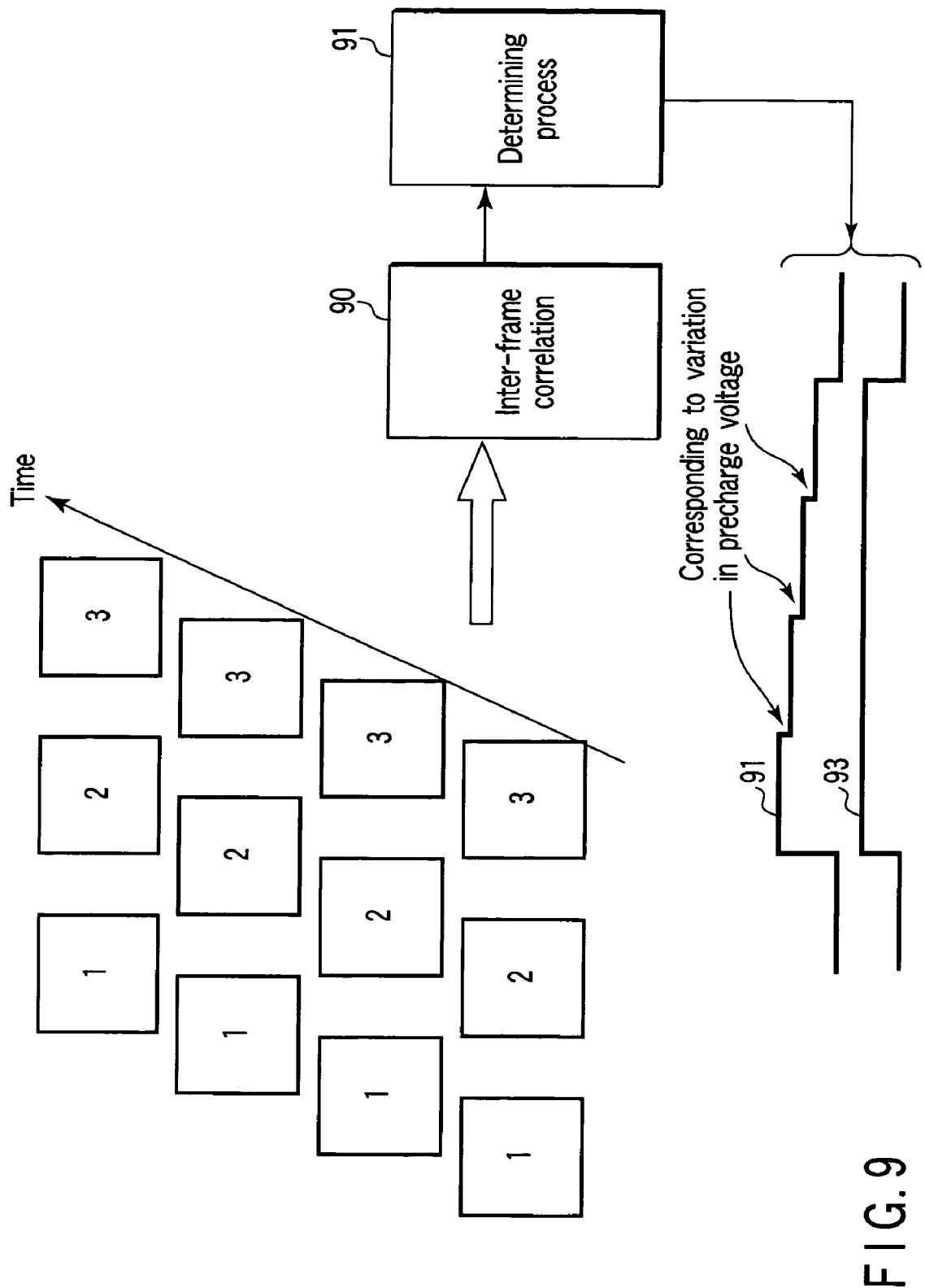
FIG. 9 is a diagram illustrating an example of noise measures included in the examples of operations of the device according to the present invention.

FIG. 9 shows an example in which frame correlations are utilized to determine whether or not a touch operation has been performed on any of numeric keys such as those shown in FIGS. 8A and 8B. For example, the precharge voltage provided to the sensor capacitor CS is varied for each frame (for example, at 4-frame periods). Then, if there is no operation on the numeric keys have been operated, if a correlation process (inter-frame correlation 90) is executed on the frames, then the read voltage (image pickup data) exhibits a correlation corresponding to a variation in precharge voltage (determining process 91, determination result 92). However, when one of the numeric keys is operated, it is possible to identify a phenomenon in which a correlation corresponding to a variation in precharge voltage (predetermined correlation) is not obtained (determination result 93)

Figure 10:
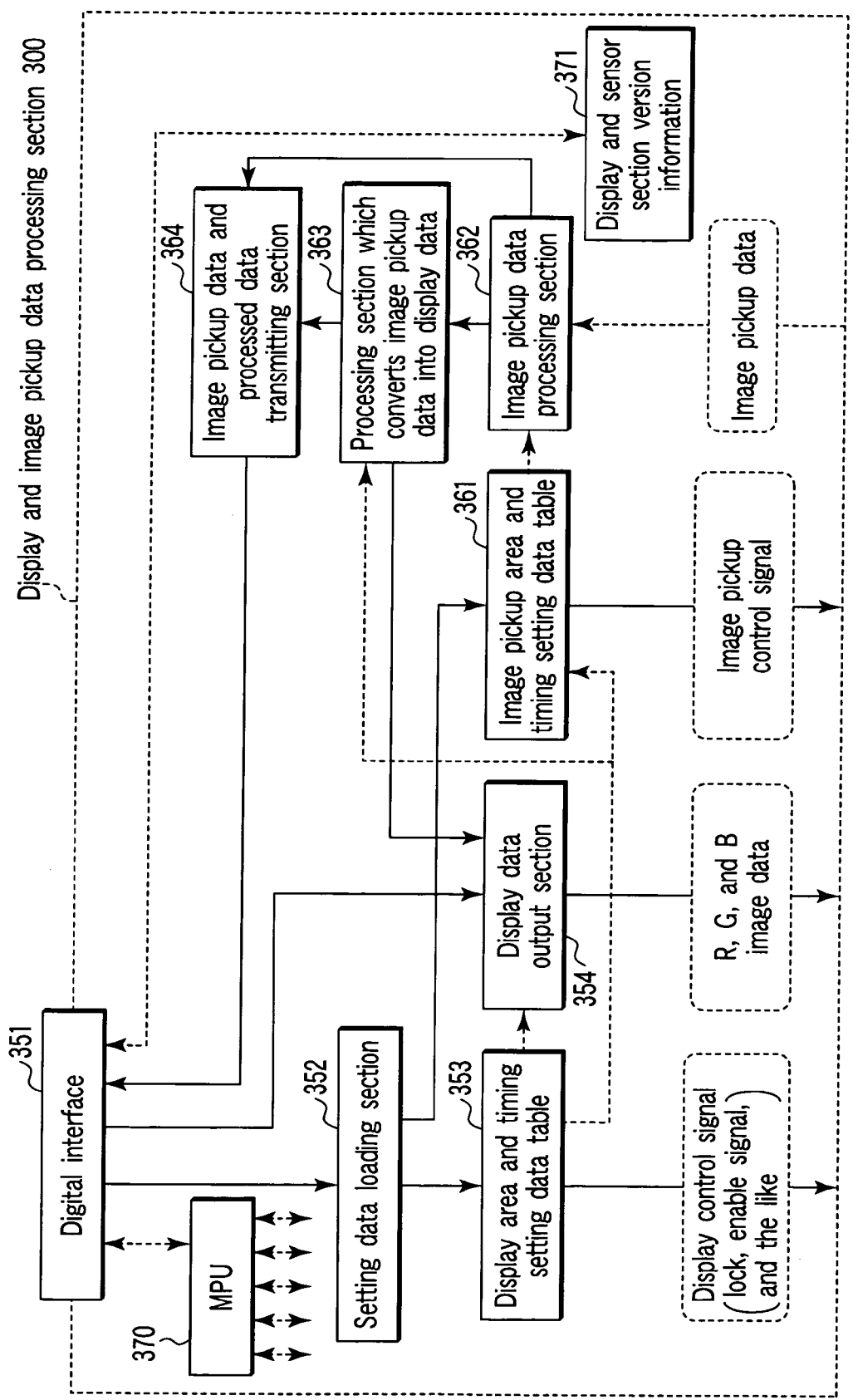
FIG. 10 is a diagram of the configuration of function blocks of the display and image pickup data processing section of the device according to another aspect of the present invention.

FIG. 10 shows another embodiment of the display and image pickup data processing section 300, shown in FIGS. 1 and 2. This example is provided with a display area and timing setting data table 353 and a display data output section 354. It is also provided with an image pickup area and timing setting data table 361 and an image pickup data processing section 362. Display area and timing setting data and image pickup and timing setting data are loaded into the corresponding tables via a digital interface 351 and a setting data loading section 352.

Ten key image data such as the one previously described can be stored in the display data output section 354. Further, to display the ten key image data, data required to generate a corresponding timing signal is stored in a table 353. Image pickup data is loaded on the basis of image pickup area and timing setting data output by the image pickup area and timing setting data table 361. The image pickup data is processed by the image pickup data processing section 362 as described in FIGS. 8A, 8B, and 9. A process of determining contents is also executed.

Depending on the application, image pickup data must be converted into display data. For example, if a handwritten character is input, it may be converted into display data for display. In this case, a conversion processing section 363 that converts image pickup data into display data executes a converting process. The conversion processing section 363 then transfers the resulting display data to a display data output section 354.

Further, image pickup data or data obtained by processing the image pickup data can be transmitted to an external apparatus. In this case, the data is accumulated in an image pickup data and processed data transmitting section 364 and then output to an external apparatus via the digital interface. In general, operating timings for each block are provided and the gate control of outputs and inputs is performed under the control of a microprocessing unit (MPU) 370. Moreover, a ROM 371 stores version information on the display and sensor section 100 and information on systems that can be handled by the present device. The information includes, for example, horizontal resolution, vertical resolution, clock frequency, and power supply voltage specification information. The system control section can read the version information to select an application that can be handled by the display and sensor section 100.

Figure 11:
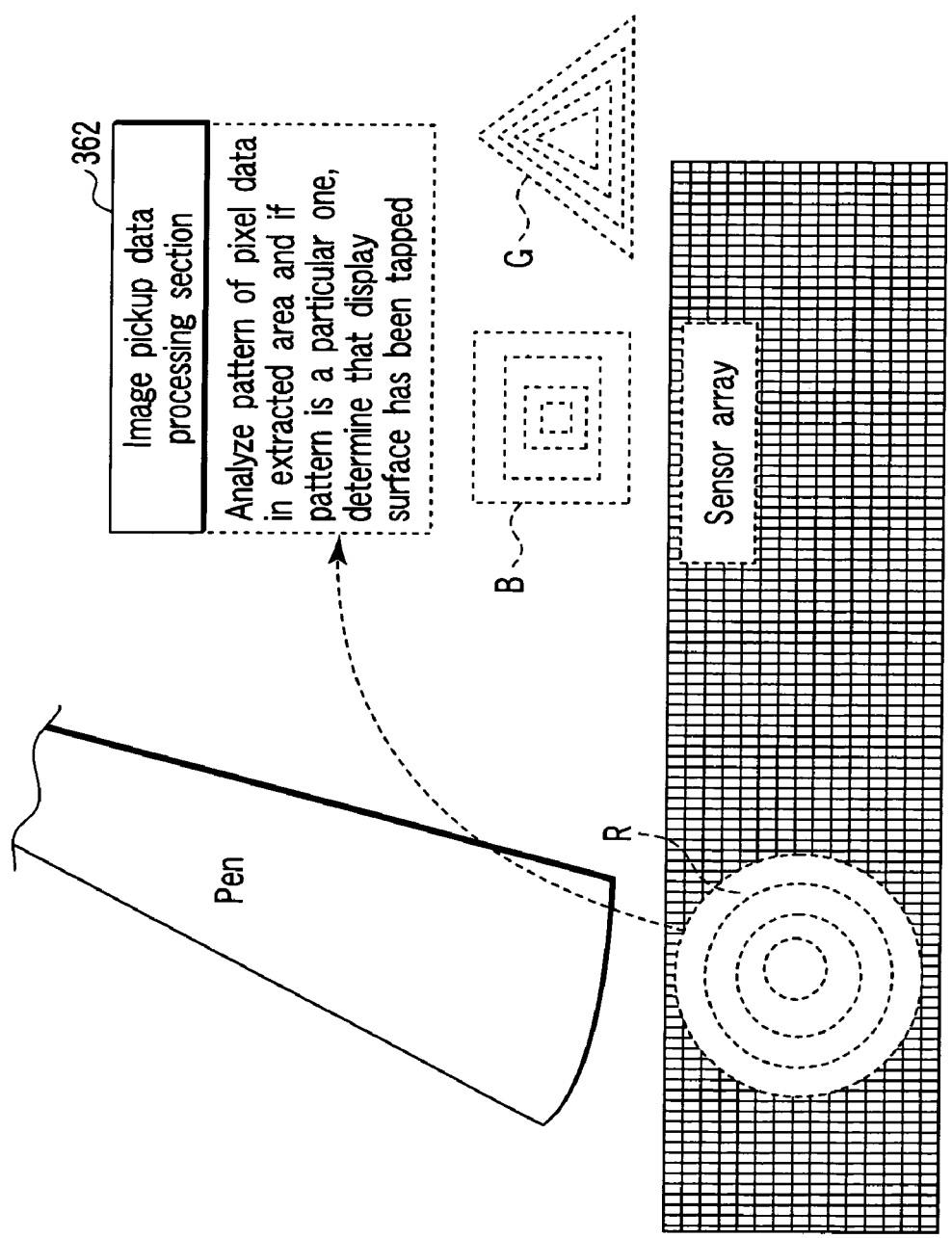
FIG. 11 is a diagram illustrating another example of noise measures included in the examples of operations of the device according to the present invention.

FIG. 11 shows another example of the device according to the present invention. This device is specifically adapted to accurately read write signals. The tip of a pen 600 has a pattern of multiple circles. Accordingly, when the pen tip touches the sensor array, the sensor array catches the pattern of multiple circles as the pattern on the pen tip. Since this pattern is distinctive, an image pickup data processing section 362 can analyze and easily identify the pattern. A circle is particularly suitable for the pattern because it is not affected by the angle at which the user holds the pen. The same image can be picked up at whatever angle the user tilts the pen in holding it.

Instead of the pattern of multiple circles, a pattern of multiple rectangles or multiple triangles may be used. Alternatively, multiple circles may be treated as, for example, a red (R) input, multiple rectangles may be treated as, for example, a blue (B) input, and multiple triangles may be treated as, for example, a green (G) input. The colors may be identified on the basis a combination of a pattern and the pitch between lines. That is, when a pen with a pattern of multiple lines is used to draw a line, the pattern and the pitch between multiple lines can be sensed at the beginning of the line. Accordingly, the pitch between multiple lines of a pattern can be utilized as identification information. For example, a pattern of multiple circles may be used with which an inter-line pitch P1 is determined to be red and with which an inter-line pitch P2 is determined to be green and with which an inter-line pitch P3 is determined to be blue.

Second Embodiment According to Image Pickup System

A second embodiment is characterized in that the precharge voltage of the sensor capacitor CP is varied with the sensors on the basis of the results of calibration image pickup. In the calibration image pickup, light from the backlight is, for example, uniformly applied. In this case, even within the same chip, there may be noticeable differences among the optical sensors (photodiodes) PD or transistors nt2 formed on the glass substrate. Thus, disadvantageously, some parts of the image may appropriately show reflected light from an indicating member such as a finger in white while showing the absence of reflected light in black, but other parts may undergo underexposure or overexposure to prevent the indicating section from being properly detected. This is due to differences among the currents through the optical sensors or differences among the thresholds of the transistors nt2. In this case, the underexposure or overexposure is avoided by increasing the precharge voltage of the sensor capacitor of each sensor circuit.

Specifically, a method described below is used. First, for calibration image pickup, solid uniform white paper is tightly contacted with the display surface, and an image is picked up with the precharge voltages of the sensor capacitors uniformly set at 5 V. This can be easily accomplish by utilizing, for the calibration image pickup, a cover 150 of a set into which the display device (display and sensor section 100) according to the present invention is incorporated, the cover 150 being internally painted in white, as shown in FIG. 4.

Figure 12A:
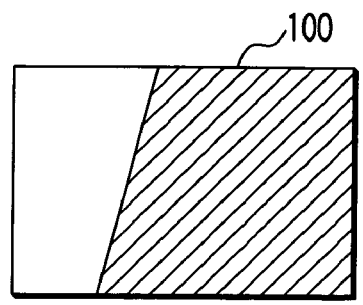
FIGS. 12A and 12B are diagrams illustrating an example of a method of retrieving an appropriate precharge voltage in connection with an image pickup operation performed by the device according to the present invention.
Figure 12B:
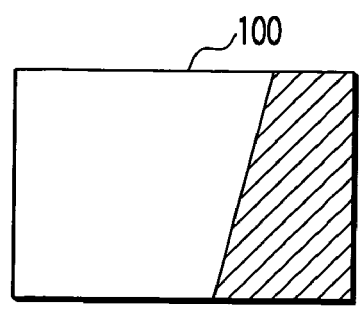

First, the calibration image pickup is carried out using two precharge voltage levels (5 V and 4 V). FIGS. 12A and 12B show examples of images obtained.

In FIG. 12B, the right side of the picked-up image is too black in spite of the capacitor has been precharged to the lower voltage of 4 V. It is difficult to output white to this part because for example, too small a current flows through the corresponding optical sensor during irradiation with light. Thus, for actual image pickup, the sensor capacitor of the sensor circuit corresponding to the right side of the display screen is precharged to 3.5 V. The precharged voltage is thus reduced to allow white to be easily output.

In contrast, it is difficult to output black to this part because for example, too large a current flows through the corresponding optical sensor during irradiation with light. Thus, for actual image pickup, the sensor capacitor of the sensor circuit corresponding to the right side of the display screen is precharged to, for example, 4.5 V. The precharged voltage is thus increased to make it difficult to output.

The central part of the picked-up image corresponds to an optical sensor through which an appropriate current flows. Thus, for actual image pickup, the sensor capacitor of the sensor circuit corresponding to the central part of the display screen is precharged to 4.0 V.

Figure 13:
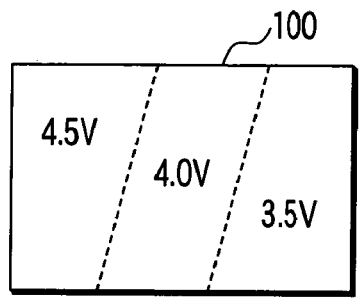
FIG. 13 is a diagram showing an example of the distribution, on an input surface, of appropriate precharge voltages determined using the method shown in FIG. 12.
Figure 14:
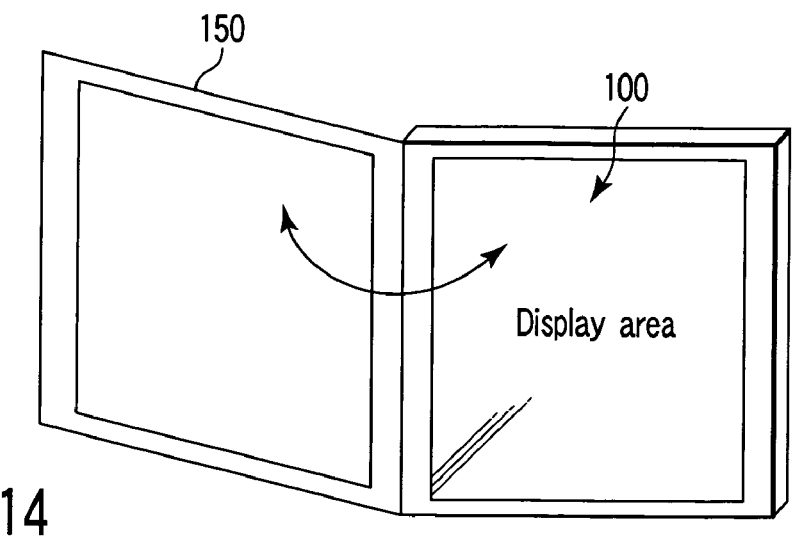
FIG. 14 is a diagram showing an example of the appearance of an input sensor containing display device according to the present invention.

FIG. 13 shows a summary of the above. The above image pickup enables the prevention of malfunction in which the indicating member such as the finger cannot be recognized or is incorrectly recognized. Information on the value of the precharge voltage of the sensor capacitor of each sensor circuit is saved to the SRAM 311, the value being determined on the basis of the results of the calibration image pickup. This information may be transferred to the system control section via the digital interface 302 so as to be loaded into the SRAM 311 when the system is activated, as required. The precharging of the sensor capacitor can be carried out by utilizing the DAC and signal line driving circuit on the relay board. This is because the precharging is carried out for each row while no video is being written as shown in FIGS. 4B and 5 (if all the sensor capacitors are precharged at the same time, it is impossible to increase or reduce the precharge voltage for each pixel). The sensor capacitors can be precharged without adding precharge power sources at multiple levels or a precharging circuit to a frame portion.

In the above example, the calibration image pickup is carried out using two precharge voltage levels (5 V and 4 V). However, the number of levels and the values of the voltages are not limited to this. Two or more voltage levels are effective. The more the number of voltage levels is, the more carefully the image can be adjusted.

In the above example, the actual image pickup is carried out using three precharge voltage levels (5 V, 4.0 V, and 3.5 V). However, the more the number of voltage levels is, the more carefully the image can be adjusted.

For the actual image pickup, the precharge voltage may be increased or reduced for each pixel or each group of pixels that are arbitrarily grouped. If a ten key display such as the one shown in FIG. 8 is used to detect whether or not the indicating member has touched any of the numeric keys, it is sufficient to apply the above adjustment of the precharge voltage only to the sensor capacitors of the sensor circuits for the pixels that display the numeric keys. This can be determined taking applications, system resources, or the like into account.

A brief description will be given of the general characteristics of each of the above embodiments and the characteristics of each section. The present invention comprises a group of display elements arranged in a matrix, a group of optical sensors arranged in a matrix, a display driving circuit which provides a display signal to each row of the display element group and which provides a driving signal to each row of the display element group, and a read circuit which specifies a row and a column of the optical sensor group to identify an optical sensor to read a sense signal from this optical sensor. The sense signal output by the read circuit is what is called a read signal processing section that executes a process in accordance with a command requesting execution of an application.

In this case, the read signal processing section is provided with a command register and an interface section that, upon receiving the command requesting execution of the application, transfers the command to the command register. This provides a device that is flexible enough to execute various processes.

The read signal processing section can include means for generating image data based on the sense signal. The read signal processing section can also include means for generating coordinate data on the optical sensor corresponding to the sense signal. The read signal processing section can further include means for generating image data corresponding to the sense signal and feeding the image data back to the display driving circuit. This makes it possible to reflect input information in a display image.

The present invention also provides a driving method for setting operating timings for the read circuit. This method comprises, for each of the pixel circuits constituting the display element group, setting a first and second blanking periods in a former and latter half, respectively, of one horizontal period, setting a video write period between the first and second blanking periods, setting a display period after the second blanking period and before a next one frame period, and for each of the sensor circuits constituting the sensor group, setting a period corresponding to the first blanking period of the one horizontal period as a read period, setting a period corresponding to the second blanking period as a precharge period, setting a blanking period between the read period and the precharge period, and setting an image pickup period after the precharge period and before a next one frame period. This makes it possible to achieve a write (image pickup) without affecting the display.

As a result, as shown in FIGS. 4A and 4B, the signal lines Sig(n) and Sig(n+1), used to write display data, are effectively utilized as read lines for image pickup.

That is, the display driving circuit, which provides the display signal (image data) to each row of the display element group and provides the driving signal to each row of the display element group, includes the display gate line driving circuit 112 which outputs the driving signal and a data output circuit (signal line driving circuit and precharge circuit 114) which outputs the display signal. A signal line to which the display signal is output is connected to an auxiliary capacitor of a pixel circuit and to the optical sensor via a switch (FIGS. 4A, 4B, and 6).

The signal line is also utilized to precharge a capacitor connected in parallel with the optical sensor (FIGS. 4A and 4B). The signal line is also utilized as a second signal line to obtain, via an amplifier and the switch, a variation in a voltage of a capacitor connected in parallel with the optical sensor (FIGS. 4A and 4B).

The pixel circuit is composed of an R, G, and B pixel circuits each having the signal line. A sensor circuit including the optical sensor and the capacitor connected in parallel with the optical sensor is characterized by using a first signal line for precharging, a second signal line for discharging during image pickup, and a third signal line for reading the voltage of the capacitor (FIG. 6). Of course, the sensor circuit may be provided for each of the R, G, and B pixel circuits.

The read signal processing section further includes sampling means (FIG. 8) for sampling a particular period of the sense signal. The sampling means is characterized by setting the particular period for the sampling in a particular period (particular area) of a display image formed on the display element group and display driving circuit. Further, the display image shows numeric keys, and the particular period corresponds to a key display position.

The individual sensors of the optical sensor group are included in a sensor circuit including the capacitor connected in parallel with the optical sensor, an input switch which precharges the capacitor, and an output switch which outputs a potential of the capacitor to the signal line. A precharge circuit is connected to the signal line to which the capacitor is connected via the switch. The precharge circuit has precharge varying means which can vary the precharge potential (FIGS. 9, 12A, 12B, and 13).

The precharge voltage for the optical sensor is characterized by varying with a plurality of two-dimensional areas of the optical sensor group (FIGS. 9, 12A, 12B, and 13). The differences in precharge voltage between the areas is intended to compensate for differences in sensitivity and characteristics among the plurality of optical sensors or the plurality of output amplifiers.

Further, in the device according to the present invention, transparent protective glass (or a transparent protective sheet such as a synthetic resin) is placed on top surfaces of the optical sensor group and display element group. The device is characterized by using a pen having a particular pattern at its tip if a handwritten input is provided to the optical sensor group (FIG. 11). In this case, the area of the entire pattern is such that the pattern covers a plurality of optical sensors so as to be identified.

Improved Technique for Improving Read Speed

The device according to the present invention is improved to enable an image pickup signal to be read in a short time. For this purpose, if an image pickup signal is to be read, charges are simultaneously or consecutively read from sensor circuits for a plurality of rows.

Figure 15A:
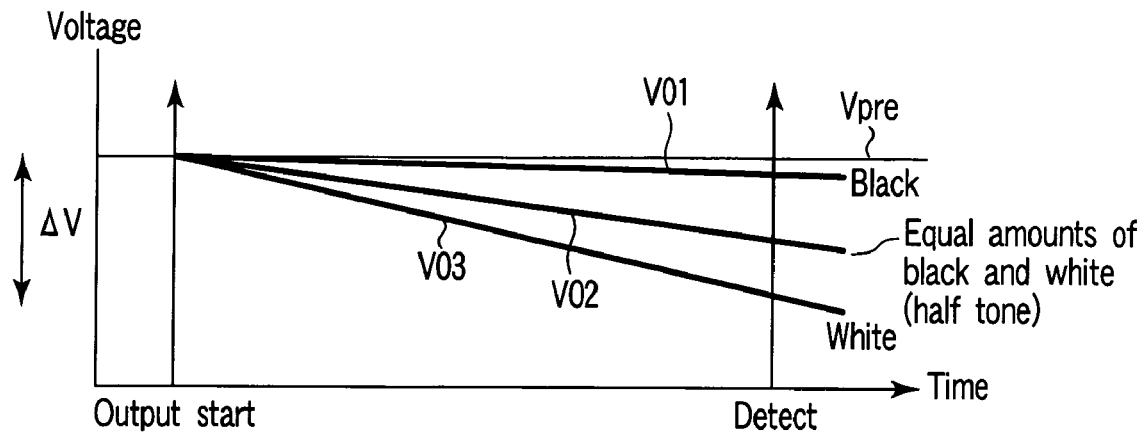
FIGS. 15A and 15B are graphs illustrating how the voltage on a signal line varies if charges are read from the sensor circuit.
Figure 15B:
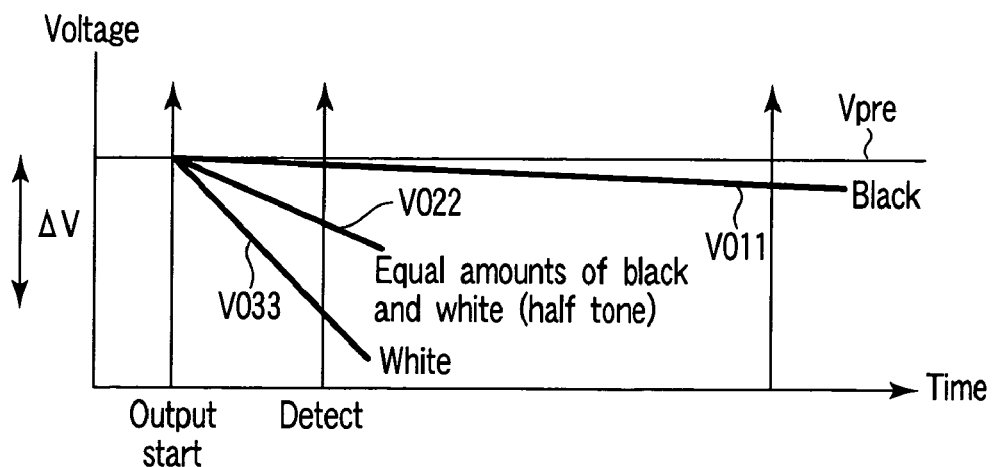

FIG. 15A shows how the voltage on one signal line varies if charges are read from one sensor circuit in one row. Before the charges are read, the signal line is charged to a predetermined voltage Vpre. Then, as previously described, charges are led out of the capacitor CP via the thin film transistors nt2 and nt3. A voltage VO1 shows a variation for a black output. A voltage VO2 shows a variation for a gray (half tone with equal amounts of black and white) output. A voltage VO3 shows a variation for a white output. In contrast, FIG. 15B shows a variation in output observed when charges from 10 sensor circuits for 10 rows are simultaneously output to the same signal line. A voltage VO11 shows a variation for a black output. A voltage VO22 shows a variation for a gray (half tone with equal amounts of black and white) output. A voltage VO33 shows a variation for a white output.

In this case, outputs from the plurality of sensor circuits for the 10 rows are added together. Accordingly, the amount of time from the beginning of output of an output signal from the sensor circuit group until detection of the output signal may be reduced compared to FIG. 15A. Moreover, if image pickup signals for one frame are to be obtained, it is possible to reduce the number of output signals to be detected. This means that a sufficient amount of time is available in processing read image pickup signals to determine the contents of the picked-up image.

Figures 16A, 16B:
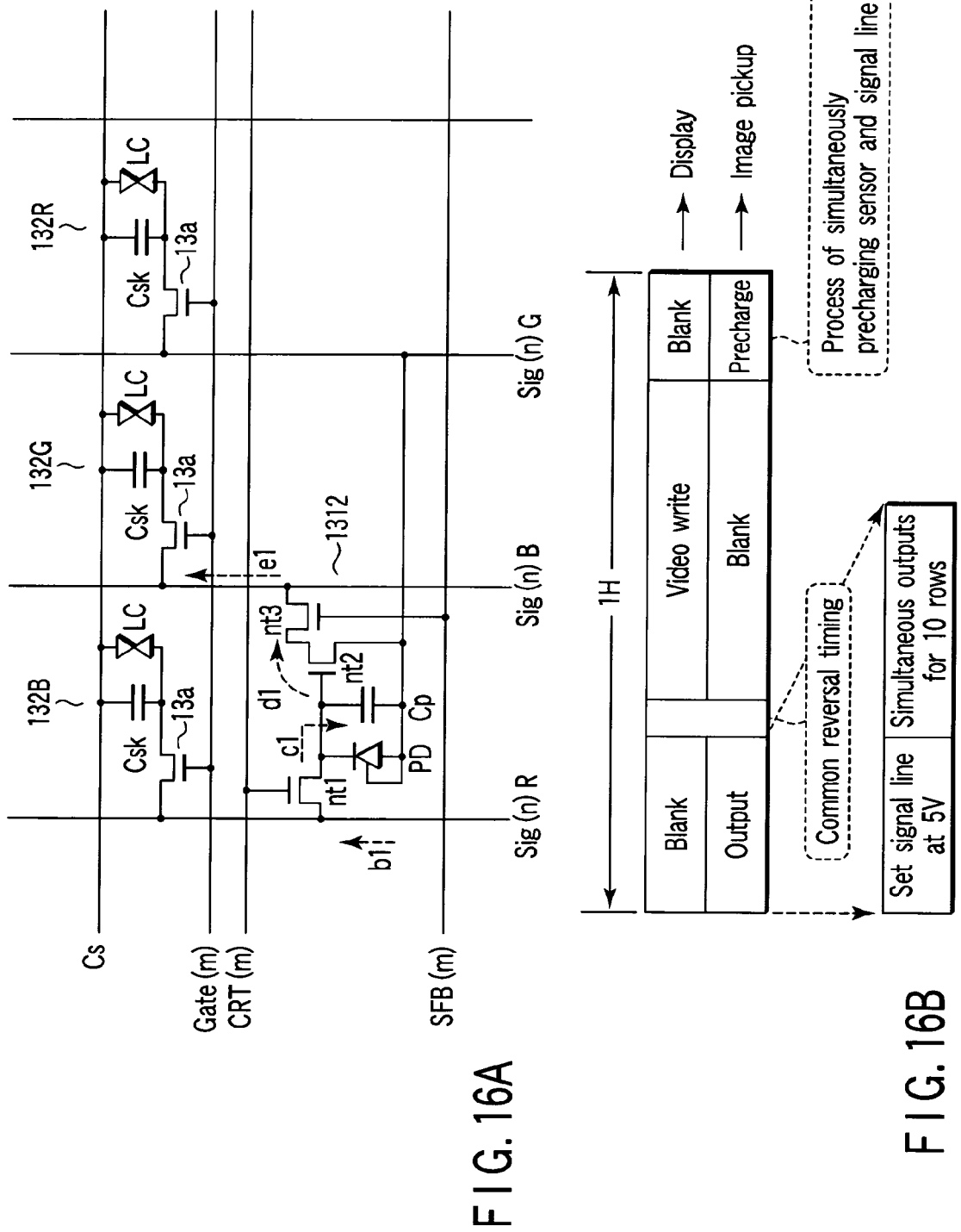
FIGS. 16A and 16B are diagrams illustrating another specific example of a pixel circuit and a sensor circuit according to the present invention.

FIGS. 16A and 16B show an example of a circuit used to simultaneously read charges from sensor circuits for 10 rows which lie on one signal line and then place the charges on the signal line. FIG. 16B is a flowchart showing operations of this circuit. Basically, the operations are similar to those described in FIGS. 4 to 6. The circuit in FIG. 16A is the same as the one shown in FIG. 6 except for the arrangement of the signal lines Sig(n)R, Sig(n)B, and Sig(n)G. The circuit in FIG. 16A is an example in which charges are read from the capacitor Cp and placed on the one signal line Sig(n)B. However, actually, charges are simultaneously read from sensor circuits for 10 rows and placed on the signal Sig(n)B. Further, the figure shows the one signal line Sig(n)B. However, in fact, a large number of the signal lines Sig(n)B are present.

The signal lines Sig(n)B, Sig(n)G, and Sig(n)R are utilized to write video signals to the corresponding capacitors Cs while the switch transistor 13a is on. If video signals have been written to the capacitor Csk, the capacitor Csk drives the liquid crystal LC. An image is displayed on the basis of the driven state of a plurality of integrated liquid crystals LC. In this case, the image relates to an input sensor. For example, an image of numeric keys or switches is displayed.

Such a symbol image is not realized with only one pixel. A set of a plurality of symbols forms a symbol image. Thus, the present invention pays attention to the fact that such a symbol image is appropriately obtained by performing each write operation on a plurality of pixels. Accordingly, video signals are written by performing each write operation on pixels in a plurality of rows. The figure shows only a circuit having three display elements in one row. However, actually, video signals are written to, for example, the capacitors Csk of the display element circuits (display element group) for 10 rows in a time division manner.

Moreover, according to the present invention, each process of reading an image pickup signal is executed on, for example, the sensor circuits (sensor circuit group) for 10 rows. Operations of the sensor circuit will be described below.

The signal line Sig(n)R is utilized to precharge the capacitor CP of the sensor circuit 1321 to a predetermined potential during the precharge period. The figure shows only one sensor circuit in one row, but in fact, the capacitors CP of the sensor circuits (sensor circuit group) for 10 rows are precharged via the signal line Sig(n)R.

The signal line Sig(n)G is utilized to emit a current flowing through the photodiode PD, during the image pickup period. This current emitting operation can be performed by appropriately setting the potential of the signal line Sig(n)G. When light impinges on the photodiode PD, a current flows which corresponds to the quantity of light. Consequently, the potential of the capacitor CP decreases. The signal line Sig(n)B is utilized to amplify and read the voltage of the capacitor CP while image pickup signals are being output. In this case, the signal Sig(n)B is precharged to, for example, 5 V. Provided that the capacitor CP is precharged to 5 V and the voltage has not decreased, the potential of the signal line Sig(n)B remains unchanged during the output period (black output). If the voltage of the precharged capacitor CP decreases from 5 V during the output period, the potential of the signal line Sig(n)B varies (half tone output or white output). This potential is read by the analog-to-digital conversion circuit and data output circuit.

Figure 17:
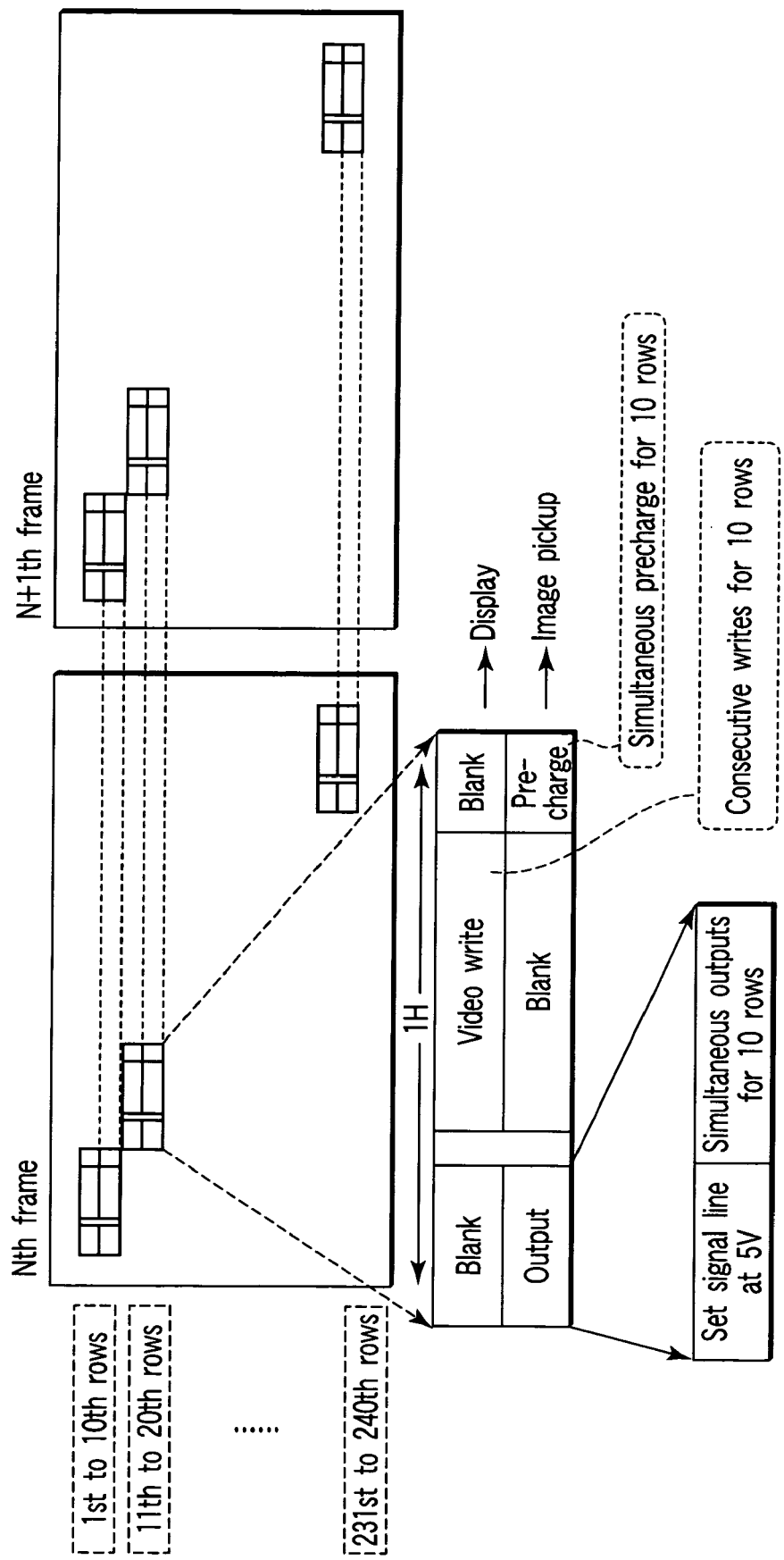
FIG. 17 is a diagram illustrating display and image pickup timings for each frame in the circuit in FIG. 16.

FIG. 17 illustrates the above operations for each frame (Nth and N+1th frames). FIG. 17 shows almost the same contents as those shown in FIG. 5. However, in this example, each read operation is performed on 10 rows. Consequently, the time (1/10) TPF required to read information from the sensor circuit group within one frame is one-tenth of the time TPF required to perform each read operation on one row. Thus, a sufficient time is available in processing a detection signal obtained from the sensor circuit. It is important to provide a sufficient time for this process. This is because a sufficient time is required to make various logical determinations on information obtained from the sensor circuit group. In connection with a write of video signals, a symbol image of, for example, numeric keys or switches is not realized with only one pixel. A set of a plurality of symbols forms a symbol image. Thus, the present invention pays attention to the fact that such a symbol image is appropriately obtained even by performing each write operation on a plurality of pixels. Accordingly, video signals are written to pixels in a plurality of rows. This also provides a sufficient time for a write process. If video signals are to be written, then for example, the write circuit (signal line driving circuit and precharge circuit 114) outputs video signals R, G, and B for 10 rows to the signal lines Sig(n)R, Sig(n)B, and Sig(N)G, respectively, during a video write period (shown in FIGS. 16B and 17B) in a time division manner. The signal line driving circuit and precharge circuit 114 comprises a function for switching and setting the potential of the signal line to an appropriate value in order to accomplish these operations. The present invention is not limited to the above embodiment.

Figures 18A, 18B:
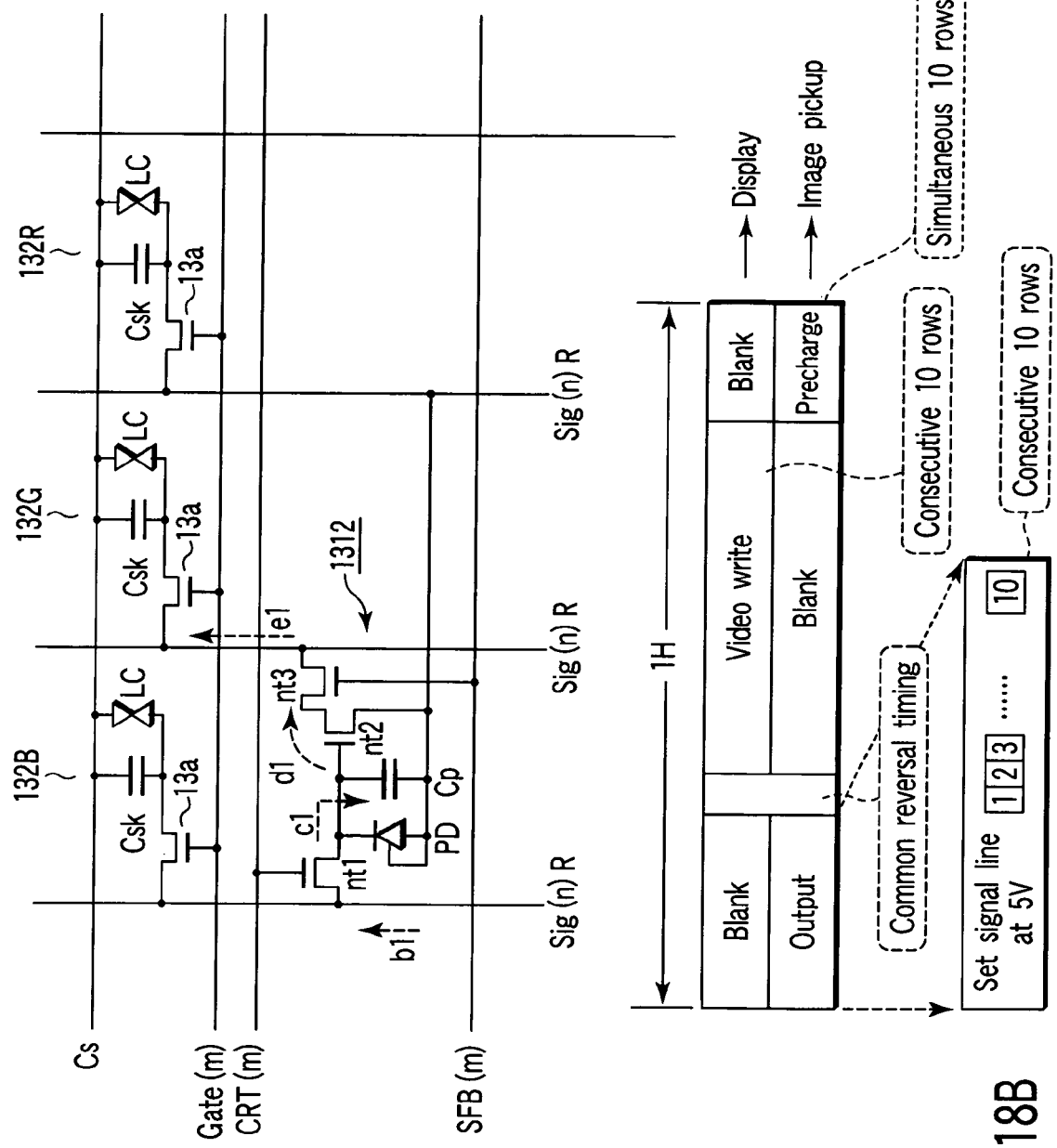
FIG. 18A is a diagram illustrating another specific example of a pixel circuit and a sensor circuit according to the present invention.
FIG. 18B is a timing chart illustrating operations of the circuit in FIG. 18A.

FIGS. 18A and 18B show another embodiment of the present invention. This embodiment differs from the embodiment shown in FIGS. 16A and 16B in a method for consecutively and sequentially reading, for example, 10 rows in reading image pickup signals from the sensor circuit group (output period). Specifically, an operation is repeated which reads charges from sensor circuits for 10 rows in a time division manner and which then measures the potential on the signal line. The remaining part of the method is the same as that in the embodiment shown in FIGS. 16A and 16B. Accordingly, the description of the same part is omitted.

Figure 19:
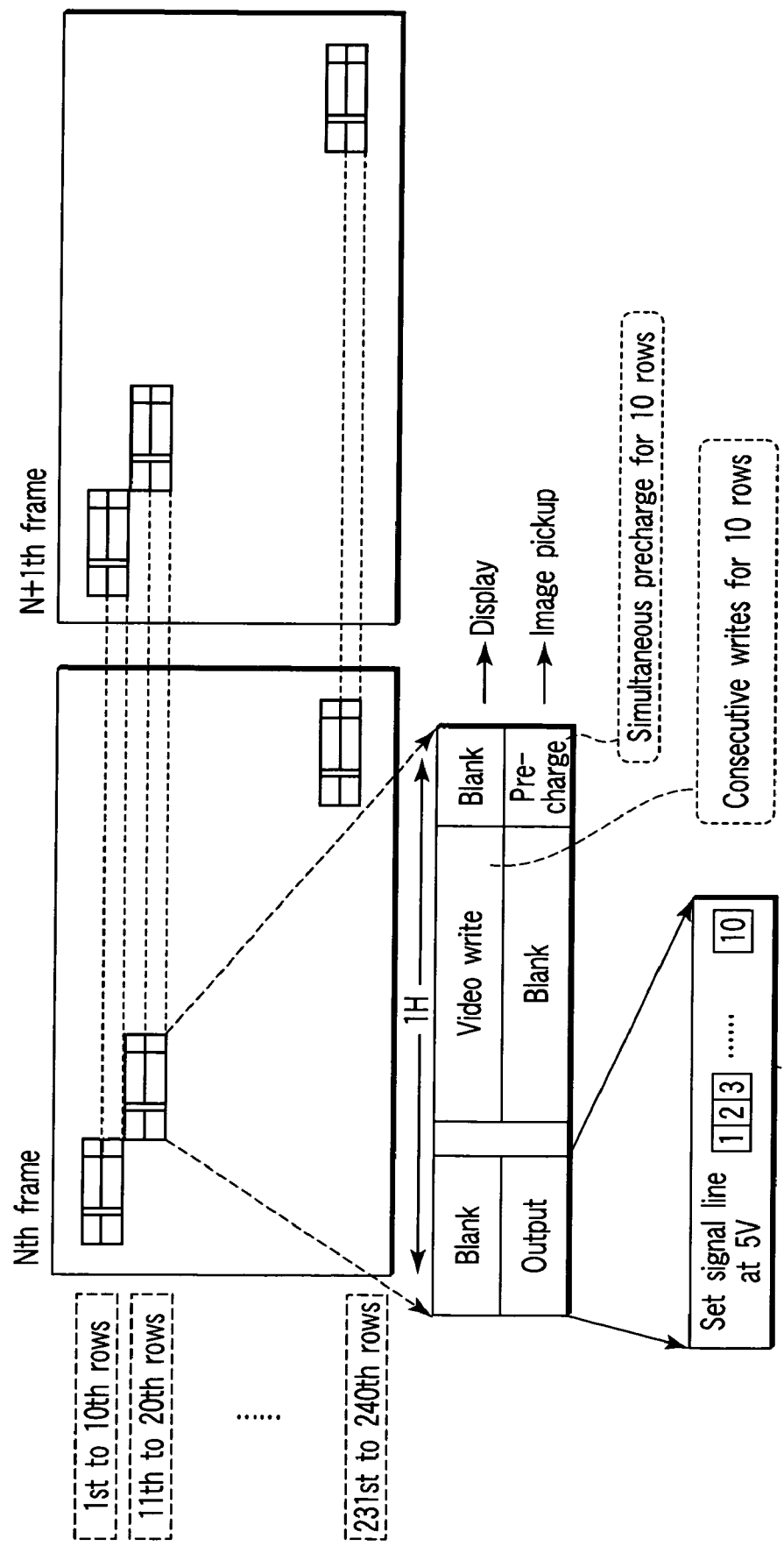
FIG. 19 is a diagram illustrating display and image pickup timings for each frame in the circuit in FIG. 18A.

FIG. 19 illustrates the operations shown in FIG. 18A, for each frame (Nth and N+1th frames). Outputs from sensor circuits for 10 rows are read during each read operation. Therefore, the time (1/10) TPF required to read information from the sensor circuit group within one frame is one-tenth of the time TPF required to perform each read operation on one row, each read operation being followed by measurement. Thus, a sufficient time is available in processing a detection signal obtained from the sensor circuit.

Figure 20:
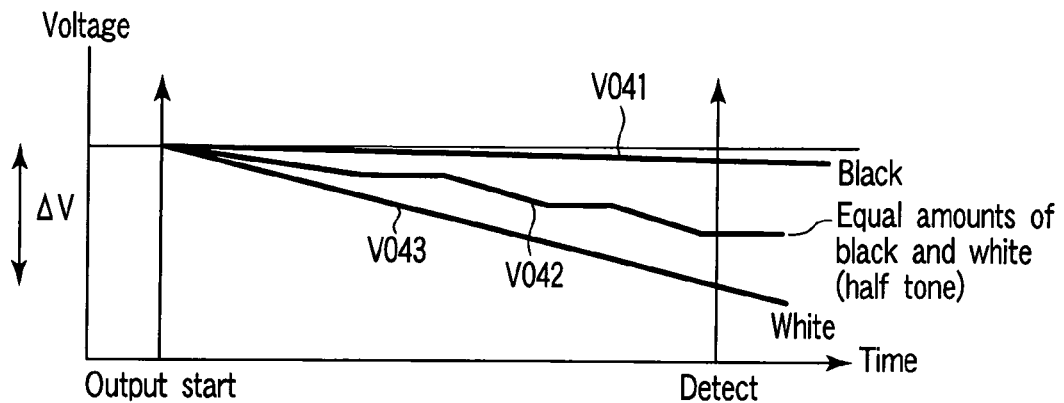
FIG. 20 is a graph illustrating how the voltage on a signal line varies if charges are read from the sensor circuit.

FIG. 20 shows various examples in which outputs from the sensor circuit group for 10 rows are obtained. This figure shows how outputs vary when charges from sensor circuits for 10 rows are sequentially output to the same signal line. A voltage VO41 shows a variation for a black output. A voltage VO42 shows a variation for a gray (half tone with equal amounts of black and white) output. A voltage VO43 shows a variation for a white output. In this case, the average of outputs from sensors for 10 rows is output.

The above image pickup signal is digitalized by the analog-to-digital conversion circuit. Then, the resulting image pickup data is output via the data output circuit. The image pickup data is loaded into the write/read exclusive processing section 312. The write/read exclusive processing section 312 efficiently loads the image pickup data.

The characteristics of the above embodiment will be described below in brief.

The device according to the present invention has a display element circuit group including a plurality of display elements arranged in a matrix and a sensor circuit group including optical sensors arranged in a matrix. In this case, a display driving circuit provides a display signal to column lines of the display element circuit group and provides a driving signal to row lines of the display element circuit group. A read circuit specifies one column line and a plurality of row lines of the optical sensor circuit group for a part of one particular horizontal period within one frame to identify a group of a plurality of optical sensor circuits to read sense signals from the plurality of optical sensors as arithmetic outputs. A read signal processing means processes the sense signals output by the read circuit.

Further, the read circuit has means for controlling the sensor circuit group so that the arithmetic outputs are led out to a signal line used by the display element circuit group. Alternatively, the read circuit may have means for controlling the optical sensor group so that sense signals are simultaneously read, as arithmetic outputs, from the plurality of optical sensors during the part of the particular horizontal period within the one frame.

Alternatively, the read circuit may have means for controlling the optical sensor group so that sense signals are sequentially read, as time division outputs, from the plurality of optical sensors during the part of the particular horizontal period within the one frame.

Alternatively, the read circuit may include means for, before reading sense signals from the plurality of optical sensors as arithmetic outputs, setting a signal line onto which the sense signals are loaded, at a predetermined potential.

Improvement for Obtaining Stable Image Pickup Outputs without Being Affected by Differences in Characteristics among Amplifiers As described above, the pixel and sensor (which may also be referred to as read/write pixel) section is composed of the display pixel circuit 1311 and the read sensor circuit 1312. Now, description will be given of means for canceling differences in threshold potential among the amplifying elements constituting the sensor circuit 1312.

Figure 21:
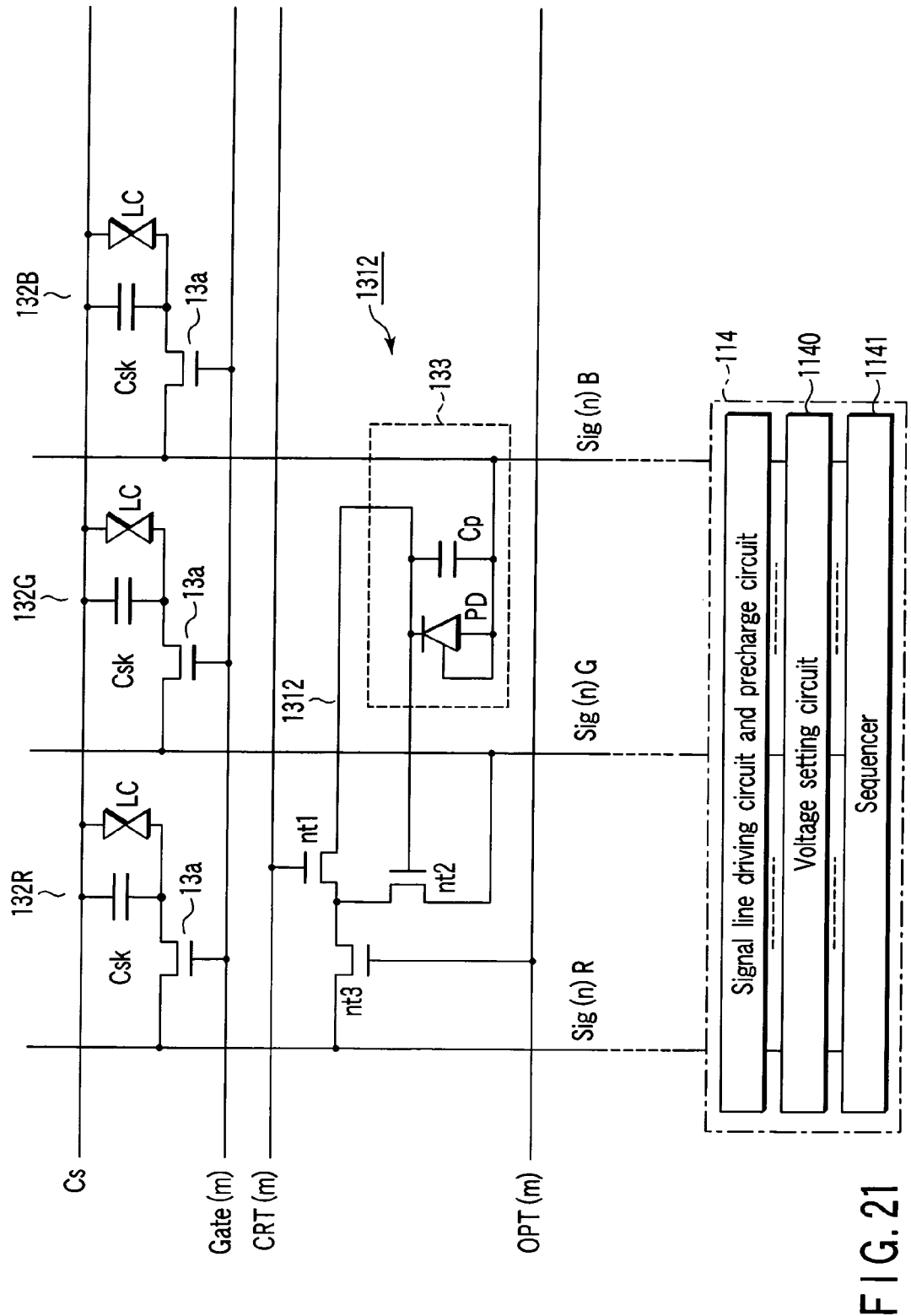
FIG. 21 is a diagram illustrating another specific example of the pixel circuit and sensor circuit shown in FIG. 3.

FIG. 21 shows an example of the configuration of a basic circuit for read/write pixels. Cs denotes a voltage line that provides a predetermined potential to one electrode of each of the auxiliary capacitor Csk and liquid crystal LC at predetermined periods. Gate(m) denotes a gate line that controllably turns on and off the thin film transistors (TFT; referred to as driving transistors below) 13a of the pixel circuit 1311.

In the figure, the pixel circuit 1311 can display colors. That is, in the figure, the pixel circuit 1311 is composed of pixel circuits 132R, 132G, and 132B. Sig(n)R, Sig(n)G, and Sig(n)B denote signal lines formed at horizontal positions of the respective pixel circuits 132R, 132G, and 132B. The signal lines Sig(n)R, Sig(n)G, and Sig(n)B are connected between the signal line driving circuit and precharge circuit 114 and the analog-to-digital conversion circuit.

As shown in FIG. 3, display image data R, G, and B are supplied to the corresponding signal lines via the signal line driving circuit and precharge circuit 114. The image data R, G, and B are then written to the corresponding auxiliary capacitors Csk when the gate line Gate(m) located at a position where the data are to be displayed are turned on. This causes the liquid crystals LC corresponding to the image data R, G, and B to be driven.

Further, CRT(m) denotes a gate line that controllably turns on and off the thin film transistor nt1 constituting the sensor circuit 1312 (in this case, the transistor nt1 functions as a difference canceling transistor. OPT(m) denotes a gate line that controllably turns on and off the thin film transistor nt3 constituting the sensor circuit 1312 (in this case, the transistor nt3 functions as an I/O transistor.

The voltage line CS and the gate line Gate(m) are connected to the display gate line driving circuit 112. The gate line CRT(m) is connected to the read gate line driving circuit 122.

Reference numeral 133 denotes a sensor section forming the sensor circuit 1312. In the sensor section, the capacitor Cp and the photodiode PD form a parallel circuit. One electrode of the sensor section 133 is connected to the gate of the thin film transistor nt2 (in this case, the transistor nt2 functions as an amplifying transistor). The other electrode of the sensor section 133 is connected to, for example, the signal line Sig(n)B.

The difference canceling transistor nt1 is connected in series between the one electrode of the amplifying transistor nt2 and the one electrode of the sensor section 133. One electrode of the I/O transistor nt3 is connected to one electrode of the amplifying transistor nt2. The other electrode of the I/O transistor nt3 is connected to the first signal line Sig(n)R. The other electrode of the amplifying transistor nt2 is connected to the second signal line Sig(n)G. The other electrode of the sensor section 133 is connected to the second signal line Sig(n)B.

If the photodiode PD is irradiated with a large quantity of light, the sensor capacitor Cp discharges a large quantity of electricity. In contrast, if the photodiode PD is irradiated with a small quantity of light, the sensor capacitor Cp discharges a small quantity of electricity. Light is blocked between the photodiode PD and the backlight (not shown). The photodiode PD is not affected by the backlight.

The signal line driving circuit and precharge circuit 114 is connected to the signal lines Sig(n)R, Sig(n)G, and Sig(n)B.

The signal line driving circuit and precharge circuit 114 further includes or relatedly has a voltage setting circuit 1140. The signal line driving circuit and precharge circuit 114 can thus controllably switch the potentials of the signal lines Sig(n)R, Sig(n)G, and Sig(n)B. Moreover, in response to a sequence control signal from a sequencer 1141, the signal line driving circuit and precharge circuit 114 can obtain potential switching timings. The sequence signal from the sequencer 1141 is based on a control signal from the display and image pickup data processing section 300.

Figure 22:
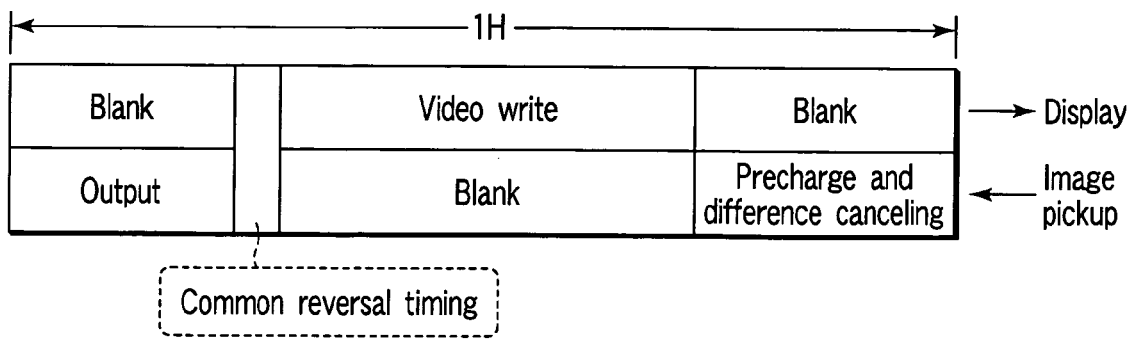
FIG. 22 is a diagram illustrating operational timings for the pixel circuit and sensor circuit in FIG. 21.

FIG. 22 is a timing chart showing operations of the pixel circuit 1311 and sensor circuit 1312.

Writing image data to the pixel circuits 132R, 132G, and 132B and reading an image pickup signal from the sensor circuit 1312 are carried out during a particular horizontal period within one frame period. For the pixel circuit (which may also be referred to as the display element circuit) 1311, one horizontal period (1H) is divided into a first blank period, a common reversal timing period, a write period, and a second blanking period. In association with these four periods, for the sensor circuit 1312, one horizontal period is divided into an output period, a common reversal timing period, a blank period, and a precharge and difference canceling period. In the periods other than the above particular ones within one vertical period (one frame period), the pixel circuit 1311 is in the display period, while the sensor circuit 1312 is in the image pickup period.

Moreover, in particular, operations of the sensor circuit 1312 will be described in detail.

During the precharge period of the capacitor Cp, a first predetermined potential (for example, 5 V) is provided to the first signal line Sig(n)R. A zero potential is provided to the second and third signal lines Sig(n)G and Sig(n)B. Simultaneously or subsequently, the difference canceling transistor nt1 is turned on via the first gate line CRT(m). Further, the I/O transistor nt3 is turned on via the second gate line OPT. Then, during the difference canceling period following the precharge period, the difference canceling transistor nt1 is turned on via the first gate line CRT(m). Further, the I/O transistor nt3 is turned off via the second gate line OPT.

Then, during the difference canceling period, the initial potential of the capacitor Cp is set equal to the threshold Vth of the amplifying transistor nt2. Specifically, when the capacitor Cp has a high potential immediately after charging, the transistor nt2 is turned on to discharge electricity. The potential then decreases down to the threshold Vth of the transistor nt2. During the difference canceling period, the initial potential of the capacitor Cp is set equal to the threshold Vth of the amplifying transistor nt2.

In this state, during the subsequent image pickup period, the difference canceling transistor nt1 is turned off via the first gate line CRT(m). Further, the I/O transistor nt3 is turned off via the second gate line OPT(m). In this state (image pickup period=(one frame period)−(one horizontal period (particular horizontal period))), if the photodiode PD is irradiated with, for example, reflected light from the touching finger, the sensor capacitor Cp further discharges electricity. In contrast, if the photodiode PD is not irradiated with light, the sensor capacitor Cp is prevented from further discharging electricity.

During the read period, sampling of the first predetermined potential (5 V) is executed on the first signal line Sig(n)R. The second signal line Sig(n)R is provided with zero potential. The third signal line Sig(n)B is provided with a potential that is almost half the preset maximum variation range of the sensor section 133, for example, 0.5 V. However, this value may be adjusted depending on TFT characteristics or parasitic capacitances. This value is below the maximum variation range of the sensor section. Setting this value corresponds to shifting an input to the amplifying transistor nt2 by a predetermined value via the capacitor Cp before a read.

At the same time, the difference canceling transistor nt1 is turned off via the first gate line CRT(m). Further, the I/O transistor nt3 is turned on via the second gate line OPT(m). The term "sampling" as used in the specification means that the signal line is connected to a 5-V power supply line to set the signal line potential at 5 V and that the signal line is then electrically separated from the 5-V power supply line.

It is assumed that in the image pickup period, the potential (5 V) of the capacitor Cp decreases by 1 V. Then, in the read period, the amplifying transistor nt2 has a gate voltage of (Vth −0.5 V). For this potential, since the third signal line Sig(n)B is provided with a shift of 0.5 V, (−1) +0.5=−0.5 V is added to Vth. If the capacitor Cp no longer discharges electricity, the amplifying transistor nt2 has a gate potential of (Vth +0.5 V).

Thus, when the third signal line Sig(n)B is provided with 0.5 V as described above, the first signal line Sig(n)R is provided with the first predetermined potential (5 V) (sampling), and the second signal line Sig(n)G is provided with a zero potential, if the capacitor Cp no longer discharges electricity, then the transistor nt2 is turned on. On the other hand, if the capacitor Cp further discharges electricity, the transistor nt2 remains on.

As a result, the voltage of the signal Sig(n)R varies reliably depending on whether or not the capacitor Cp discharges electricity. In other words, the adverse effects of differences in characteristics among the transistors nt2 can be avoided to reliably obtain an output from the sensor circuit.

As described above, during the difference canceling period, the initial potential of the capacitor is set equal to the threshold Vth of the amplifying transistor. Consequently, for optical detections, whether or not the potential across the capacitor has varied can be determined depending on whether or not the potential of the capacitor is substantially maintained at the threshold Vth or decreases from this value. A detection based on this determination is carried out during the read period. In this case, the device determines whether or not the predetermined potential of the first signal line Sig(n)R varies, that is, whether the amplifying transistor remains off or is turned on.

Figure 23:
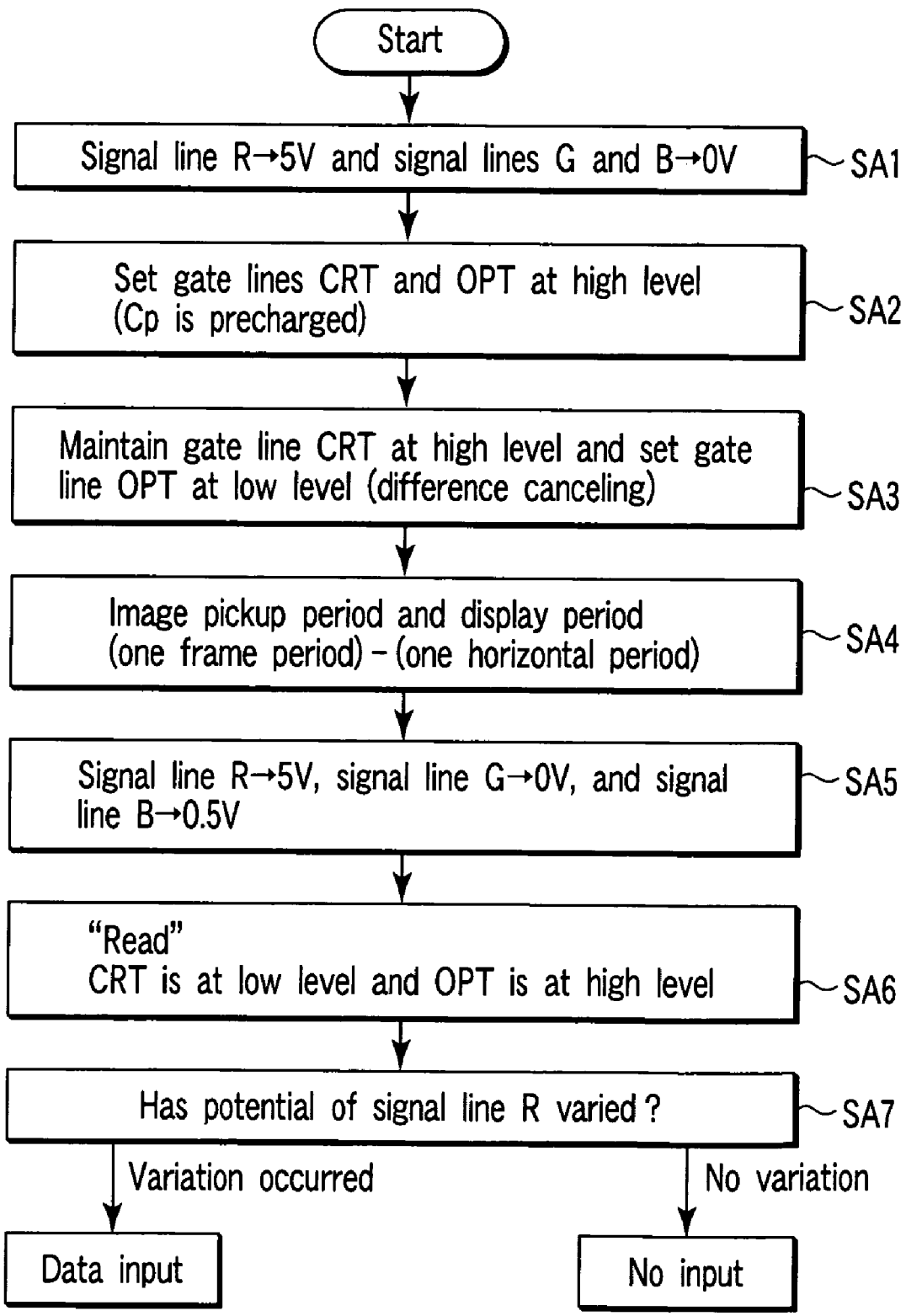
FIG. 23 is a flowchart of a control section that controls the pixel circuit and sensor circuit in FIG. 21.

FIG. 23 is a flowchart showing a process procedure executed by the sequencer 1142, provided particularly to drive the sensor circuit 1312 in order to perform the above operations. The sequencer 1141 may be incorporated into the signal line driving circuit and precharge circuit 114, shown in FIG. 3, or may be provided in the timing controller 306, shown in FIG. 2. Steps SA1 to SA3 correspond to the precharge and difference canceling period, previously described. Step SA4, which follows step SA3, corresponds to the image pickup period. Steps SA5, SA6, and SA7, which follow step SA4, correspond to the above read period. Whether or not there has been an input is determined depending on whether or not the predetermined potential of the first signal line Sig(n)R varies.

FIG. 24 illustrates the above operations for each frame (Nth and N+1th frames).

The present invention may be improved so that an image pickup signal can be obtained in a short time. Thus, according to the present invention, if an image pickup signal is to be read, changes are simultaneously or consecutively read from sensor circuits for a plurality of rows.

For example, according to the present invention, each operation of reading an image pickup signal is executed on sensor circuits (sensor circuit group) for 10 rows. Operations of the sensor circuit will be described below.

Figure 25:
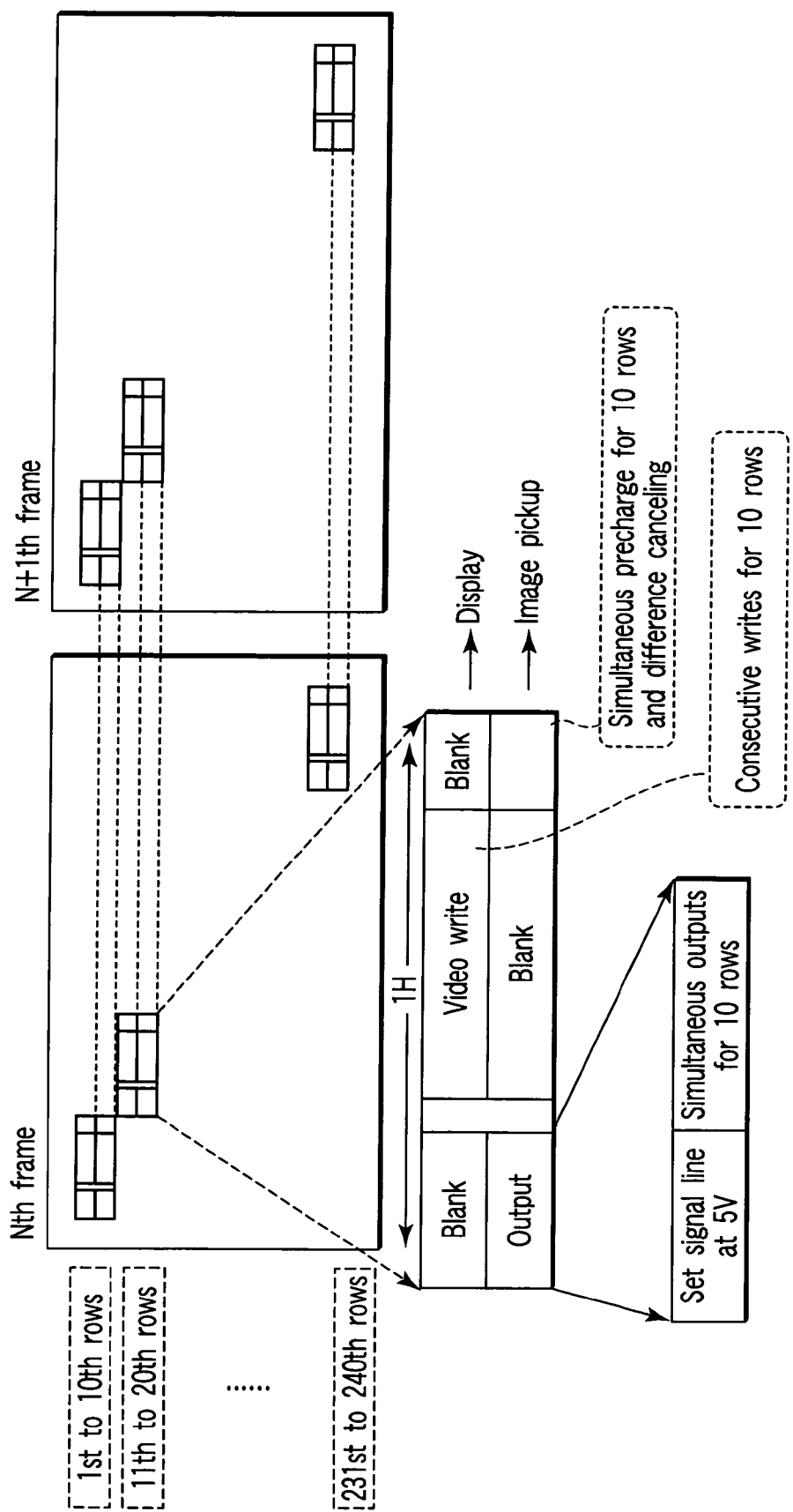
FIG. 25 is a diagram illustrating another example of display and image pickup timings for each frame in the device according to the present invention.

FIG. 25 illustrates the above operations for each frame (Nth and N+1th frames). FIG. 25 shows almost the same contents as those shown in FIG. 24. However, in this example, each read operation is performed on 10 rows. Consequently, the time (1/10) TPF required to read information from the sensor circuit group within one frame is one-tenth of the time TPF required to perform each read operation on one row. Thus, a sufficient time is available in processing a detection signal obtained from the sensor circuit. It is important to provide a sufficient time for this process. This is because a sufficient time is required to make various logical determinations on information obtained from the sensor circuit group. In connection with a write of video signals, a symbol image of, for example, numeric keys or switches is not realized with only one pixel. Thus, the present invention pays attention to the fact that such a symbol image is appropriately obtained even by performing each write operation on a plurality of pixels. Accordingly, video signals are written to pixels in a plurality of rows. This also provides a sufficient time for a write process. If video signals are to be written, then for example, the write circuit (signal line driving circuit and precharge circuit 114) outputs video signals R, G, and B for 10 rows to the signal lines Sig(n)R, Sig(n)B, and Sig(N)G, respectively, during the video write period in a time division manner. The signal line driving circuit and precharge circuit 114 comprises a function for switching and setting the potential of the signal line to an appropriate value in order to accomplish these operations.

The present invention is not limited to the above embodiments. In implementation, the present invention can be embodied by varying the components of the embodiments without departing from the spirit of the present invention. Further, various inventions can be formed using appropriate combinations of a plurality of components disclosed in the above embodiments. For example, some of all the components shown in the embodiments may be omitted. Moreover, components from the different embodiments may be appropriately combined together. Therefore, configurations obtained by combining a plurality of the embodiments described above are within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An input sensor containing display device comprising:
   a group of pixel circuits arranged in a matrix;
   a group of sensor circuits arranged in a matrix;
   a display driving circuit which provides a display signal to each column of the group of pixel circuits and which provides a driving signal to each row of the group of pixel circuits;
   a read circuit which specifies a row and column of the group of sensor circuits to identify an optical sensor to read a sense signal from this optical sensor, the read circuit specifying one column line and a plurality of row lines of the group of sensor circuits for a part of one particular horizontal period within one frame to identify a plurality of sensor circuits to read sense signals from the plurality of sensor circuits as arithmetic outputs;
   a read signal processing section which processes the sense signal output by the read circuit in accordance with a command requesting execution of an application;

a command register provided in the read signal processing section; and an interface section provided in the read signal processing section to transfer, when the command requesting execution of the application is sent to the interface section, the command to the command register.

2. The input sensor containing display device according to claim 1, wherein the read circuit has means for controlling the group of sensor circuits so that the arithmetic outputs are led out to a signal line used by the group of pixel circuits.

3. The input sensor containing display device according to claim 1, wherein the read circuit has means for controlling the group of sensor circuits so that sense signals are simultaneously read, as arithmetic outputs, from the plurality of sensor circuits during the part of the particular horizontal period within the one frame.

4. The input sensor containing display device according to claim 1, wherein the read circuit has means for controlling the group of sensor circuits so that sense signals are sequentially read, as time division outputs, from the plurality of sensor circuits during the part of the particular horizontal period within the one frame.

5. The input sensor containing display device according to claim 1, wherein the read circuit includes means for, before reading sense signals from the plurality of sensor circuits as arithmetic outputs, setting a signal line that is the column line, at a predetermined potential.

6. An input sensor containing display device comprising:
a group of pixel circuits arranged in a matrix;
a group of sensor circuits arranged in a matrix;
a display driving circuit which provides a display signal to each column of the group of pixel circuits and which provides a driving signal to each row of the group of pixel circuits;
a read circuit which specifies a row and column of the group of sensor circuits to identify an optical sensor to read a sense signal from this optical sensor;
a read signal processing section which processes the sense signal output by the read circuit in accordance with a command requesting execution of an application;
a command register provided in the read signal processing section;
an interface section provided in the read signal processing section to transfer, when the command requesting execution of the application is sent to the interface section, the command to the register;
an amplifier which amplifies a signal from an optical sensor provided in each of the pixel circuits;
the optical sensor connected to a corresponding input of the amplifier;
means for setting an input voltage of the amplifier to an operating threshold of the amplifier; and
means for shifting the input voltage of the amplifier by a predetermined value before the amplifier outputs a signal.

7. The input sensor containing display device according to claim 6, wherein the predetermined value is set smaller than a signal variation range of the optical sensor.

8. An input sensor containing display device comprising:
a group of pixel circuits arranged in a matrix;
a group of sensor circuits arranged in a matrix;
a display driving circuit which provides a display signal to each column of the group of pixel circuits and which provides a driving signal to each row of the group of pixel circuits;
a read circuit which specifies a row and column of the group of sensor circuits to identify an optical sensor to read a sense signal from this optical sensor;
a read signal processing section which processes the sense signal output by the read circuit in accordance with a command requesting execution of an application;
a command register provided in the read signal processing section; and
an interface section provided in the read signal processing section to transfer, when the command requesting execution of the application is sent to the interface section, the command to the register,
wherein the each of sensor circuits includes,
a sensor section in which a capacitor and a photodiode form a parallel circuit,
an amplifying transistor having a gate to which one electrode of the sensor section is connected,
a difference canceling transistor connected in series between one electrode of the amplifying transistor and the one electrode of the sensor section,
an I/O transistor having one electrode connected to the one electrode of the amplifying transistor,
a first signal line connected to the other electrode of the I/O transistor,
a second signal line connected to the other electrode of the amplifying transistor,
a third signal line connected to the other electrode of the sensor section,
a first gate line connected to a control gate of the difference canceling transistor,
a second gate line connected to a control gate of the I/O transistor,
means for, during a precharge period of the capacitor, providing a first predetermined potential to the first signal line while providing a zero voltage to the second and third signal lines, to turn on the difference canceling transistor via the second gate line while turning on the I/O transistor via the second gate line,
means for, during a difference canceling period following the precharge period, turning on the difference canceling transistor via the first gate line while turning off the I/O transistor via the second gate line,
means for, during an image pickup period, turning off the difference canceling transistor via the first gate line while turning off the I/O transistor via the second gate line, and
means for, during a read period, providing the first signal line with the first predetermined potential while providing the second signal line with a zero voltage and the third signal line with a potential which is almost half a preset maximum variation range of the sensor section, to turn off the difference canceling transistor via the first gate line while turning on the I/O transistor via the second gate line.

9. The input sensor containing display device according to claim 8, further comprising means for reading a variation in a potential of the first signal line during the read period.

10. The input sensor containing display device according to claim 9, wherein the first, second, and third signal lines are connected to a corresponding red (R) pixel circuit, green (G) pixel circuit, and blue (B) pixel circuit to input display signals.

* * * * *